(12) United States Patent
Adams et al.

(10) Patent No.: US 7,724,664 B2
(45) Date of Patent: May 25, 2010

(54) PACKET COMMUNICATIONS NETWORK CONGESTION ALLEVIATION METHOD AND APPARATUS

(75) Inventors: John L Adams, Felixstowe (GB); Avril J Smith, Oxford (GB)

(73) Assignee: British Telecommunications public limited company, London (GB)

( * ) Notice: Subject to any disclaimer, the term of this patent is extended or adjusted under 35 U.S.C. 154(b) by 1457 days.

(21) Appl. No.: 10/478,373

(22) PCT Filed: Jun. 14, 2002

(86) PCT No.: PCT/GB02/02753

§ 371 (c)(1),
(2), (4) Date: Nov. 21, 2003

(87) PCT Pub. No.: WO02/103966

PCT Pub. Date: Dec. 27, 2002

(65) Prior Publication Data

US 2004/0141501 A1    Jul. 22, 2004

(30) Foreign Application Priority Data

Jun. 15, 2001    (EP)    ................................. 01305209

(51) Int. Cl.
*G08C 15/00* (2006.01)
(52) U.S. Cl. ...................................... 370/235; 370/468
(58) Field of Classification Search ................. 370/229, 370/230, 230.1, 231, 235, 236, 236.2, 237, 370/395.2, 395.21, 395.3, 395.41–395.43, 370/395.5, 395.52, 465–467
See application file for complete search history.

(56) References Cited

U.S. PATENT DOCUMENTS 5,903,559 A * 5/1999 Acharya et al. ............. 370/355

(Continued)

FOREIGN PATENT DOCUMENTS

EP    0 912 015    4/1999

(Continued)

OTHER PUBLICATIONS

Matrawy, A. et al., "On Layered Video Fairness on IP Networks," IEEE Global Telecommunications Conference, 2001. Globecom '01. Nov. 2001, vol. 4, pp. 2627-2633.*

(Continued)

*Primary Examiner*—Donald L Mills
(74) *Attorney, Agent, or Firm*—Nixon & Vanderhye P.C.

(57) ABSTRACT

A packet network node and method of operating a packet network node are disclosed. Conventional packet network nodes react to congestion in the packet network by dropping packets in a manner which is perceived by users to be indiscriminate. In embodiments of the present invention, communication sources precede communications with a start packet which contains a communication identifier also carried within subsequent packets of the communication. The packet network node makes an entry in a vulnerable communications table (6.4) on receipt of such a start packet. After an amount of time, and often before the cessation of a communication, such entries are removed from the vulnerable communications table. On the onset of congestion, the packet network node disclosed herein deletes packets in communications identified in the vulnerable communications table. This provides a congestion alleviation method which is less annoying to users since communications that have been in existence for longer are less susceptible to component packets being deleted.

14 Claims, 37 Drawing Sheets

U.S. PATENT DOCUMENTS

| | | | |
|---|---|---|---|
| 6,208,653 B1 * | 3/2001 | Ogawa et al. | 370/395.52 |
| 6,456,630 B1 * | 9/2002 | Packer et al. | 370/466 |
| 6,813,245 B1 * | 11/2004 | Furuno | 370/236 |
| 6,987,733 B2 * | 1/2006 | Mukouyama et al. | 370/236 |
| 7,023,851 B2 * | 4/2006 | Chakravorty | 370/392 |
| 2001/0048662 A1 * | 12/2001 | Suzuki et al. | 370/230 |
| 2001/0055313 A1 * | 12/2001 | Yin et al. | 370/466 |
| 2002/0057650 A1 * | 5/2002 | Chuah et al. | 370/232 |
| 2002/0085587 A1 * | 7/2002 | Mascolo | 370/477 |
| 2003/0067872 A1 * | 4/2003 | Harrell et al. | 370/229 |
| 2004/0062201 A1 * | 4/2004 | Deshpande | 370/235 |
| 2006/0098670 A1 * | 5/2006 | Voit et al. | 370/401 |

FOREIGN PATENT DOCUMENTS

| | | |
|---|---|---|
| EP | 1365545 A1 * | 11/2003 |
| WO | WO 00/52882 | 9/2000 |
| WO | WO 2004084508 A1 * | 9/2004 |

OTHER PUBLICATIONS

Hutschenreuther, T. et al., "Content Based Discarding in IP-routers," Ninth International Conference on Computer Communications and Networks, 2000. Oct. 2000, pp. 122-126.*

International Search Report, PCT/GB02/02753, dated Aug. 28, 2002.

"Adjustable Dual Priority Interrupt Switching Method," IBM Technical Disclosure Bulletin, vol. 37, No. 8 (Aug. 1, 1994), p. 649.

Lapid et al., "Analysis of Packet Discarding Policies in High-Speed Networks," Proceedings of the IEEE Infocom '97, IEEE Compu, vol. 3 (Apr. 7, 1997), pp. 1191-1198.

Floyd et al., "Random Early Detection Gateways for Congestion Avoidance," IEEE / ACM Transactions on Networking, vol. 1, No. 4 (Aug. 1, 1993), pp. 397-413.

Mankin et al., "Gateway Congestion Control Survey," IETF, Network Working Group, RFC 1254, Online! (Aug. 1991), pp. 1-25.

* cited by examiner

| Version | IHL | Type of Service | Total Length | | |
|---|---|---|---|---|---|
| Identification | | | DF | MF | |
| Time to Live | | Protocol | Header Checksum | | |
| Source Address | | | | | |
| Destination Address | | | | | |
| Option Code | | Message Type | Rate Advisory | | Policy Parameter |
| Source Port | | | Destination Port | | |
| UDP Length | | | UDP Checksum | | |

Figure 2

| Flow-ID | | | | | Time condition | Policy Parameter |
|---|---|---|---|---|---|---|
| Source Address | Dest'n Address | Source Port | Dest'n Port | TOS field | | |
| | | | | | | |
| | | | | | | |
| | | | | | | |
| | | | | | | |

Figure 6A

| Destination IP Address | Customer Number |
|---|---|
| aaa.bbb.ccc.ddd | X |
| eee.fff.ggg.hhh | Y |

Figure 6B

| Customer #X – Per-Customer Variables | | | | | | | |
|---|---|---|---|---|---|---|---|
| Buffer State | Delete All | No Change | Aux Flag | Timeout Pending | Search Underway | Total Rate Advisory | Last Flow-ID |
| pass | false | true | false | false | false | 0 | NULL |

Figure 7

| Customer #X – Vulnerable Flow List | | | | | | | |
|---|---|---|---|---|---|---|---|
| Flow-ID | Rate Advisory | Policy Parameter | Aux | Packet Count Flag | Packet Count | Clocktime | Window Flag |
|  |  |  |  |  |  |  |  |
|  |  |  |  |  |  |  |  |
|  |  |  |  |  |  |  |  |
|  |  |  |  |  |  |  |  |

Figure 8

PACKET COMMUNICATIONS NETWORK CONGESTION ALLEVIATION METHOD AND APPARATUS

This application is the U.S. national phase of international application PCT/GB02/02753 filed 14 Jun. 2002 which designated the U.S.

FIELD OF TECHNOLOGY

The present invention relates to a communications network and a method of operating a communications network.

BACKGROUND

In recent years, television viewers have been demanding greater choice in the video material they view. In addition, the demand for streaming video to a computer via the Internet has grown strongly. This has led to a need to supply increasing amounts of video material over local communication networks (whether the copper pairs used by telephone network operators or the coaxial cables used by cable television network operators).

In telephony networks this additional demand is being met by the introduction of Digital Subscriber Loop (DSL) technology. As its name suggests, this technology carries digital signals over the local copper loop between a user's home and a local telephone exchange. Data-rates of several megabits per second to the user's home are achievable. The digital signal is conveyed between modems placed at either end of the copper loop—the modem in the user's home usually being incorporated in a set-top box. The advantages of statistical multiplexing have led to the digital signals being organised into packets (whether they be Asynchronous Transfer Mode (ATM) packets or Internet Protocol (IP) packets).

Many cable networks are being upgraded to carry digital signals to user's homes. At least where the signals have been carried over the Internet, those digital signals are again arranged into packets.

Video material requires a data rate which varies between 1.5 Mbps (for a quality comparable to that offered by a video cassette recording) to 20 Mbps (High-Definition Television). In DSL networks, this means that a mechanism is needed to manage contention for the capacity offered over the copper loop leading to the user's home. Although cable networks can carry around sixty video streams simultaneously, their capacity is normally shared by several hundred users, meaning that contention for the capacity on the cable will also need to be managed as cable network users demand more choice in the material they view.

In a conventional telephone network, the problem of contention for scarce telecommunication resources is dealt with by simply preventing a user from receiving (or sending) any traffic unless the necessary capacity to carry that traffic can be reserved beforehand. There are numerous connection admission control schemes of this sort for packet networks too— examples include the Resource Reservation Protocol (RSVP). Although such schemes prevent congestion, connection admission control is notoriously complex for variable bit rate flows such as video flows. One proposal that alleviates this problem to some extent is disclosed in European patent application no. 0 932 282 A2. However, such schemes also suffer from the further disadvantage that data relating to each admitted flow (often referred to as 'state' in the art) must be kept for the entire duration of the admitted flow.

An alternative to the use of connection admission control in packet networks is to use reactive flow control. These schemes allow users access to communications resources but attempt to cause senders to decrease their sending rate on the onset of congestion. The scheme used for reliable transmission across the Internet (Transmission Control Protocol) is the most common example. This is unsuitable for video flows however, since real-time video servers cannot reduce their sending rate.

In most flow control schemes, all users are adversely affected by the onset of congestion. Some flow control schemes are more sophisticated, classifying traffic into different classes, with some classes being more likely to suffer packet delay or discard than others. In situations where such classification is not available or where most traffic is within one class, alternative solutions must be provided. One such alternative solution which concentrates the adverse effects of ATM cell discard on one IP packet at a time is described in 'Early Selective Packet Discard for Alternating Resource Access of TCP over ATM-UBR' by Kangsik Cheon and Shivendra S. Panwar, in the Proceedings of IEEE Conference on Local Computer Networks LCN 97, Minneapolis, Minn., Nov. 2-5, 1997.

However, none of the above proposals provides a method of managing contention in a packet network which avoids the complexity of connection admission control schemes without indiscriminately affecting users on the onset of congestion within the capacity allocated to a given class of traffic.

SUMMARY

According to the present invention, there is provided a method of operating a packet subnet, said method comprising:
  receiving one or more communication announcement packets indicative of the commencement of a packet communication through said subnet, said packet communication comprising a plurality of packets;
  responsive to receipt of said one or more communication announcement packets, storing a set of communication identifiers, each communication identifier enabling identification of packets belonging to one of said announced packet communications;
  responsive to a predetermined condition being met, removing an identifier from said set of stored identifiers prior to the cessation of the associated communication;
  on a threshold level of congestion being reached in said packet subnet:
  identifying packets belonging to a communication associated with one of said set of stored identifiers; and
  degrading the forwarding of packets so identified relative to packets belonging to other communications.

By operating a packet subnet to introduce, into a stored set of communication identifiers, on or before the commencement of a new communication, a communication identifier which enables the identification of packets belonging to the new packet communication, and discriminating against packets containing a communication identifier belonging to said set when forwarding packets during a period of congestion, a packet subnet operator is able to concentrate the adverse effects of that congestion of selected communications. By additionally removing communication identifiers from said set prior to the cessation of the associated communication, communications that have been in existence for a period of time are treated preferentially to communications that have been in existence for a shorter period of time. This has the advantage that quality of service afforded to a communication increases as the age of the communication increases. This in turn has the advantage of being less annoying to users receiving communications than the random nature of packet discard applied in conventional congestion alleviation mechanisms which might result in a communication a user has been receiving for some time being degraded whilst a newly started communication is allowed to continue.

In some embodiments, said predetermined condition comprises the elapse of a period of time after the commencement of said flow.

In preferred embodiments, said predetermined condition comprises the addition of an identifier to said set of stored identifiers. In this way, the age of a communication relative to other flows determines how packets of the flow are treated on the onset of congestion.

In a refinement of such preferred embodiments, said announcement packets contain an indication of the anticipated data-rate of said communication, said predetermined condition comprising the exceeding of a predetermined threshold by said cumulative anticipated data-rate of said communications.

In this way, it is ensured that sufficient traffic is represented by the communications identified by communication identifiers in said set to allow said node to alleviate said congestion.

Preferably, said forwarding step involves discarding said identified packets whilst forwarding said packets belonging to other communications. Discarding, rather than delaying packets, is a preferable remedy against congestion caused by real-time flows.

Preferably, each packet of a communication contains the communication identifier associated with said communication. This provides a convenient method for determining to which communication a packet belongs.

In preferred embodiments, said method further comprises, on a high level of congestion being reached in said subnet, reading said communication identifier from a packet received at a network node; and adding said communication identifier to said set. This provides a mechanism for increasing the number of packets discarded on the advent of a higher level of congestion, and thereby reacting more strongly to higher levels of congestion. Furthermore, by reading a communication identifier from a packet received at the subnet at a given time, the probability of selecting a communication which is contributing to the higher level of congestion is increased.

Preferably, said set of communication identifiers comprises a plurality of subsets of communication identifiers, a communication identifier first being placed in a first subset and moving to a second subset on the occurrence of a subset removal condition being met, wherein, on the onset of congestion, packets in said second subset are forwarded in preference to packets in said first subset.

This has the advantage of providing another gradation in the increase of quality of service offered to a communication with the age of the communication.

Preferably, said method further comprises receiving a protected-communication indication which is indicative that one or more communications are protected; wherein said communication identifier storing step stores identifiers of communications for which no such indication is received.

In this way, a mechanism is provided for allowing policy considerations to override the normal operation of the invention.

As explained at the end of the present description, a communication may comprise one or more packet flows.

According to another aspect of the present invention, there is provided a method of operating a packet network node comprising:

receiving one or more communication announcement packets indicative of the commencement of a packet communication through said node;

responsive to receipt of said one or more announcement packets, storing a set of communication identifiers, each communication identifier enabling identification of packets belonging to one of said announced packet communications;

responsive to a predetermined condition being met, removing an identifier from said set of stored identifiers prior to the cessation of the associated communication;

on a threshold level of congestion being reached in said packet node:

identifying packets belonging to a communication associated with one of said set of stored identifiers; and degrading the forwarding of packets so identified relative to packets belonging to other communications.

According to a third aspect of the present invention there is provided a packet network node comprising:

an input for receiving one or more packets;

means arranged in operation to detect congestion in said packet network node;

a communication identifier store for storing a set of communication identifiers;

means arranged in operation to detect communication announcement packets received at said input, and responsive to said detection to store, in said communication identifier store, a communication identifier included in said communication announcement packet;

means arranged in operation to remove, on a predetermined condition being met, a communication identifier from said communication identifier store prior to the cessation of the communication;

means arranged in operation, on the detection of congestion by said congestion detection means, to:

identify packets received at said input belonging to communication associated with one of said communication identifiers stored in said communication identifier store; and forward packets belonging to other communications in preference to said packets so identified.

According to a fourth aspect of the present invention, there is provided a packet communication source comprising:

an output;

means arranged in operation to generate one or more communication announcement packets;

means arranged in operation to send said communication announcement packets from said output;

means arranged in operation thereafter automatically to generate and send a plurality of packets together forming said packet communication.

BRIEF DESCRIPTION OF DRAWINGS

By way of example only, specific embodiments of the present invention will now be described with reference to the accompanying Figures in which:

FIG. 2 illustrates a control packet constructed in accordance with a first embodiment of the present invention;

FIG. 6A shows a flow-based policy table stored at the broadband access node;

FIG. 6B shows a destination IP address list stored at the broadband access node;

FIG. 7 shows state variables stored at the broadband access node in relation to each customer;

FIG. 8 shows an example of a vulnerable flows table stored in respect of each customer at the broadband access node;

DETAILED DESCRIPTION

Figure 1:
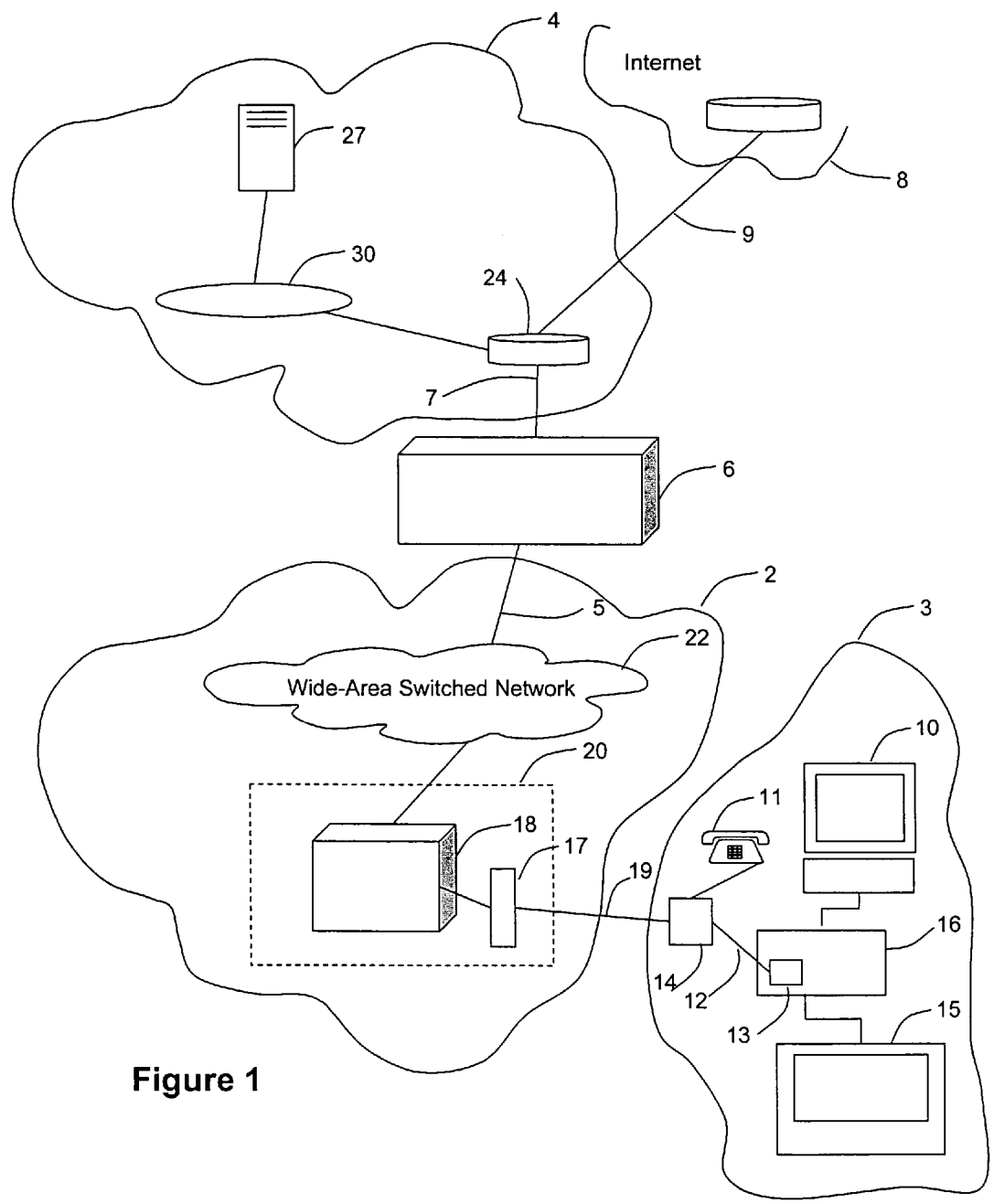
FIG. 1 illustrates a local ADSL network interconnected to the Internet.

An internetwork (FIG. 1) comprises a user's home network 3, an ATM network 2, a pair of copper wires 19 connecting the user's home network 3 to the ATM network 2, an Internet Service Provider's (ISP's) local area network 4, a Broadband Access Server (BAS) 6, an ATM network link 5 which connects the BAS 6 to the ATM network 2 and an ISP network link 7 which connects the BAS 6 to the ISP's local area network 4. In the present embodiment the BAS is provided by a modified Nortel Networks Shasta 5000 Broadband Service Node. The ISP's local area network 4 is connected to the Internet 8 via an Internet link 9.

The ATM network 2 comprises exchange-housed equipment (17,18) housed in the local telephone exchange building 20 and a wide-area switched network 22 which connects a plurality of such DSLAMs 18 (there is normally one or more DSLAMs per exchange building, only one exchange building is shown in the drawing) to the BAS 6. As will be understood by those skilled in the art, the exchange-housed equipment includes a Digital Subscriber Line Access Multiplexer (DSLAM) 18 shared between many users and, for each pair of copper wires 19, a splitter unit 17 which terminates the pairs of copper wires 19. The splitter unit 17 is effective to send signals within the frequency range used for normal telephony to the Public Switched Telephone Network (not shown) and to send signals in higher frequency bands to the DSLAM 18.

The user's home network comprises a PC 10, a digital television 15, a splitter unit 14, a router/set-top box 16 which incorporates an Asymmetric Digital Subscriber Line (ADSL) modem 13, a cable 12 interconnecting the modem 13 and the splitter unit 14, and cables connecting the router 16 to the PC 10 and the digital television 15. The splitter unit 14 is effective to send signals within the frequency range used for normal telephony to the user's telephone 11 and to send signals in higher frequency bands to the ADSL modem 13. The ADSL modem 13 represents the network termination point of the ATM network 2.

The ISP's local area network 4 comprises an IP router 24, a content provider's video server 27, and a Local Area Network 30 which interconnects them. The previously mentioned Internet link 9 is connected to the IP router 24. The Local Area Network 30 operates in accordance with the Institute of Electrical and Electronics Engineers (IEEE) 802.3 standard at a rate of 100 Mbits$^{-1}$.

In accordance with a first embodiment of the present invention, the ATM network (FIG. 1) is configured by the ATM network operator as follows. Firstly, an ATM permanent virtual circuit (PVC) is configured between the BAS 6 and each of the modems it serves. The PVC is a constant bit rate (CBR) connection whose peak cell-rate is set to 5 Mbits$^{-1}$. The ATM network operator also configures the PC 10 and digital television 15 with an IP address. Thereafter a table associating the IP address of the PC 10 and digital television 15 with a label that identifies the PVC which leads to the set-top box 16 is created in the BAS 6 by manual or automatic methods that are well-known to those skilled in the art.

FIG. 2 shows a control packet used in the first embodiment of the present invention. Those skilled in the art will recognise the control packet to be an Internet Protocol version 4 packet which is carrying a User Datagram Protocol (UDP) header only. The IP packet is conventional say for the addition of a new option (sixth row down) which forms the final four bytes of the IP packet header.

As will be understood by those skilled in the art the first byte of the options field contains an option code. In the present case, the options field identifies the packet as a control packet for use in embodiments of the present invention.

The second byte of the options field indicates the type of the control packet. Values for this byte are as follows:

| VALUE | MESSAGE TYPE |
| --- | --- |
| 01 | Start Packet |
| 02 | Congestion Notification |
| 03 | Overload Alarm |
| 04 | Too Many Flows Alarm |

In control packets that are start packets, the third byte of the options field indicates the data rate of the flow which is preceded by the start packet (the generation of a start packet will be explained in more detail with reference to FIG. 5 below. This byte for example might contain a value which indicates the data rate as a multiple of a 64 kilobits per second unit. In packets other than start packets, the rate advisory byte is set to a null value.

The final byte of the four byte option field is again only used in start packets and indicates the policy which the broadband access node is to apply to the flow which is headed by the packet. The possible values of the Policy Parameter are given below:

| VALUE | POLICY |
|---|---|
| 01 | Guaranteed |
| 02 | Bronze quality of service |
| 03 | Silver quality of service |
| 04 | Gold quality of service |

Figure 3:
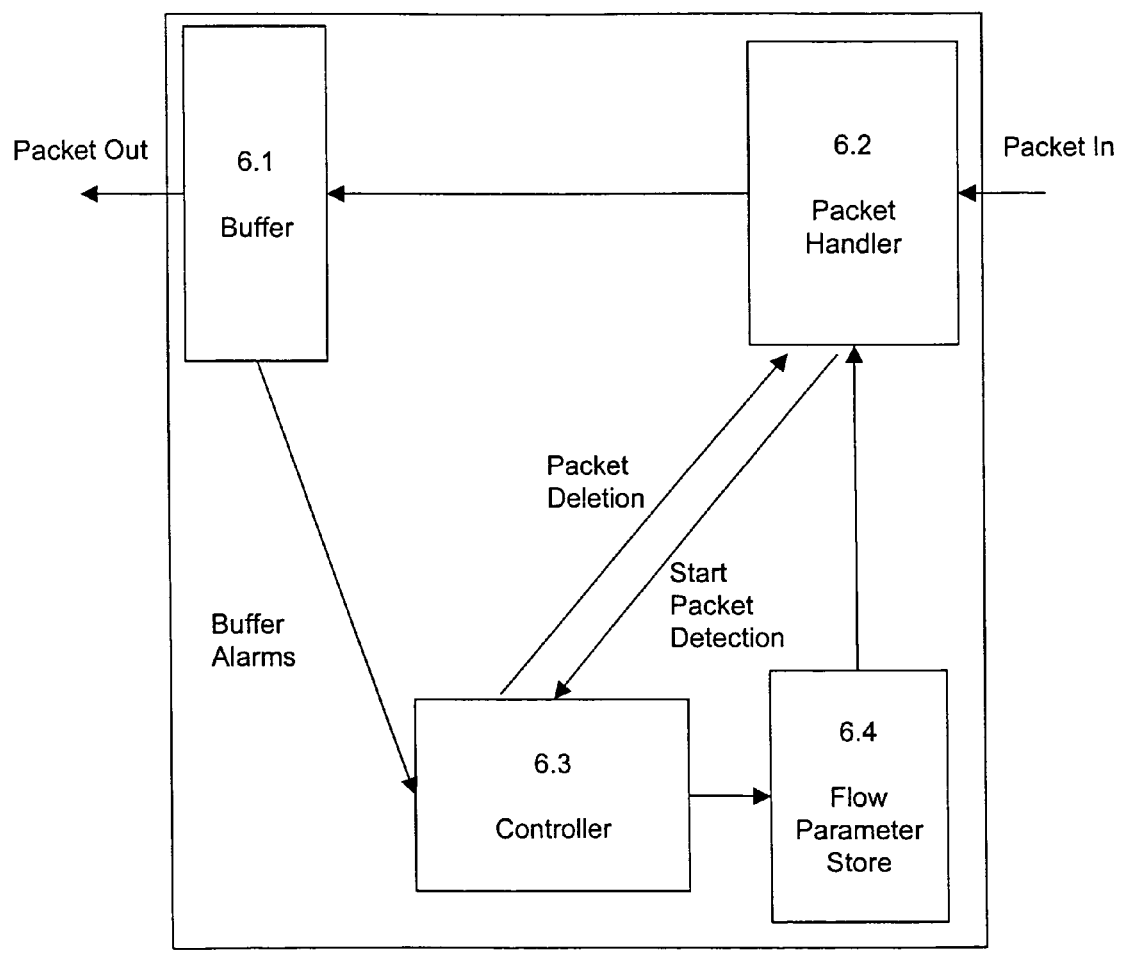
FIG. 3 is an illustration of one set of additional software components controlling, in relation to one ADSL customer, the operation of the broadband access node interconnecting the ADSL network to the Internet.

FIG. 3 shows the additional hardware/software elements required to implement the present embodiment. In the present embodiment, the software is stored within, and serves to control the operation of, the broadband access server (FIGS. 1-6). It is to be understood that an instance of each of the functional elements shown in FIG. 3 is provided for each customer.

The elements comprise a buffer 6.1, a packet handler 6.2, a controller 6.3 and a flow parameter store 6.4. As will be understood by those skilled in the art buffer 6.1 operates as a store for packets which are to be sent along the PVC connection across the wide area network (FIGS. 1-22) to the customer's home network (FIGS. 1-3). The buffer comprises an area within an electronic memory (that memory might be partitioned between buffers for all customers connected to a given DSLAM (18)). Similarly, the processing carried out in relation to each customer may comprise a virtual process running on a processor shared between those customers. The buffer 6.1 is operable to monitor the degree to which it filled and to send threshold crossing signals to the controller 6.3 on predetermined buffer-fill thresholds being reached. The controller 6.3 monitors these messages and maintains a state machine (FIG. 4) which indicates the current state of the buffer. Packet handler 6.2 is operable to detect the arrival of start packets at the broadband access server which are destined for the customer and to inform the controller 6.3 of that arrival. The controller 6.3 in turn updates the flow parameter store 6.4 with details of the newly arrived flow. Broadly speaking, the present embodiment operates by having the controller 6.3 send a packet deletion signal to the packet handler 6.2 on the buffer state moving to "delete". The packet handler 6.2 then begins to delete packets which belong to the flows whose characteristics are currently recorded within the flow parameter store 6.4. By arranging the flow parameter store to delete the details of the oldest flow in the store on accepting the details of the newly arrived flow from the controller 6.3, the deletion operation of the packet handler is concentrated on newly arrived flows.

It is to be understood that the above functionality is additional to packet scheduling functionality already present in the broadband access node (FIGS. 1-6). In particular, it is additional to a traffic shaping process which maintains the total traffic on the Permanent Virtual Connection leading to the customer's set top box to 5 Mbits$^{-1}$.

Figure 4:
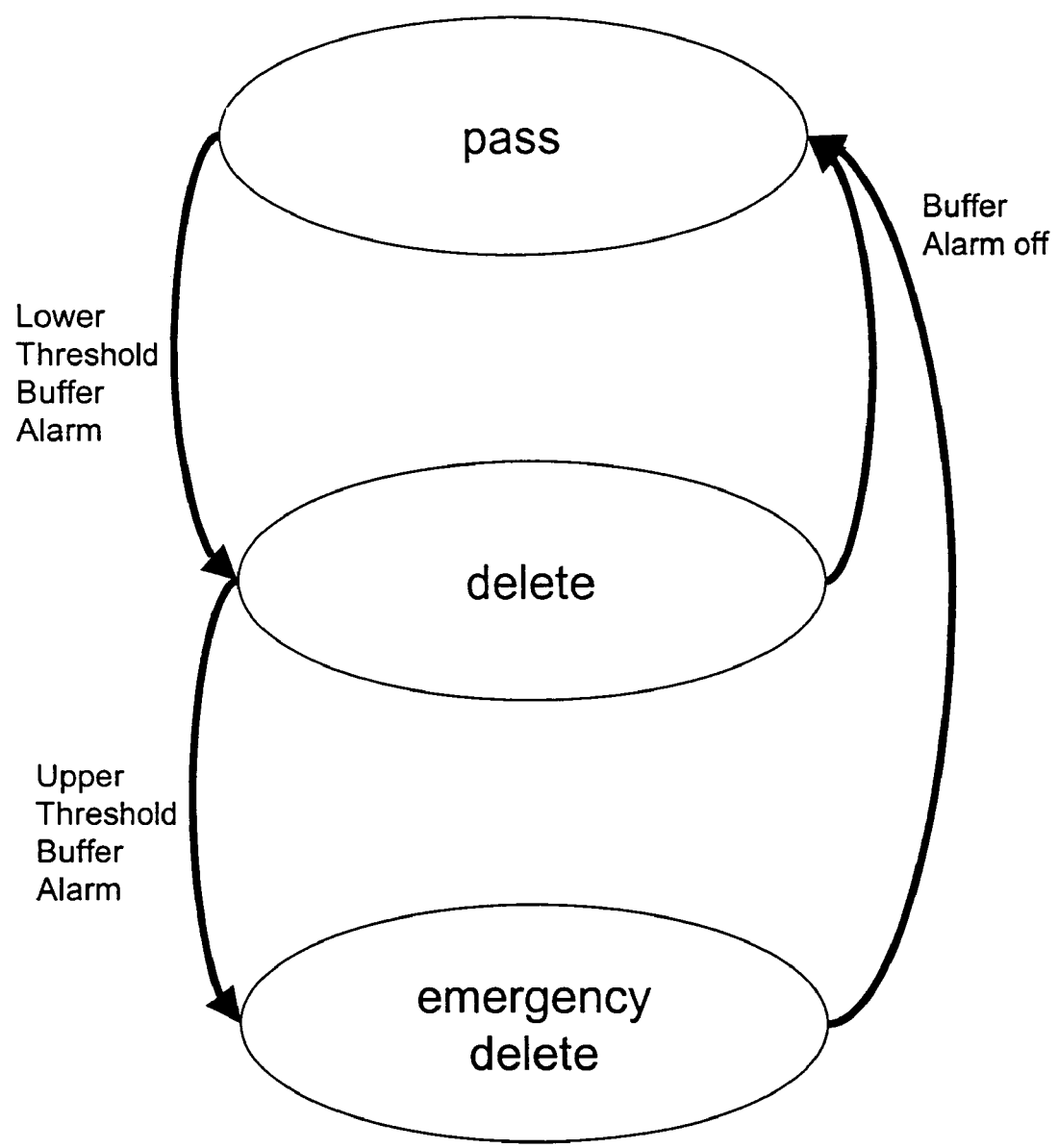
FIG. 4 shows a state machine that represents possible values of a per-customer variable which indicates the degree of congestion in a buffer serving an ADSL customer.

FIG. 4 shows the three possible states of the buffer 6.1 as monitored by the controller 6.3. The buffer is initially in a state "pass" which the controller 6.3 updates to state "delete" on receiving a lower threshold buffer alarm from the buffer 6.1. If an upper threshold buffer alarm is received from the buffer 6.1 by the controller 6.3 when it the buffer 6.1 is in the state "delete", then the buffer state is changed further to "emergency delete". If the buffer state is either "delete" or "emergency delete" then the arrival of a buffer alarm off message from the buffer 6.1 causes the controller 6.3 to change the recorded buffer state to "pass".

Figure 5:
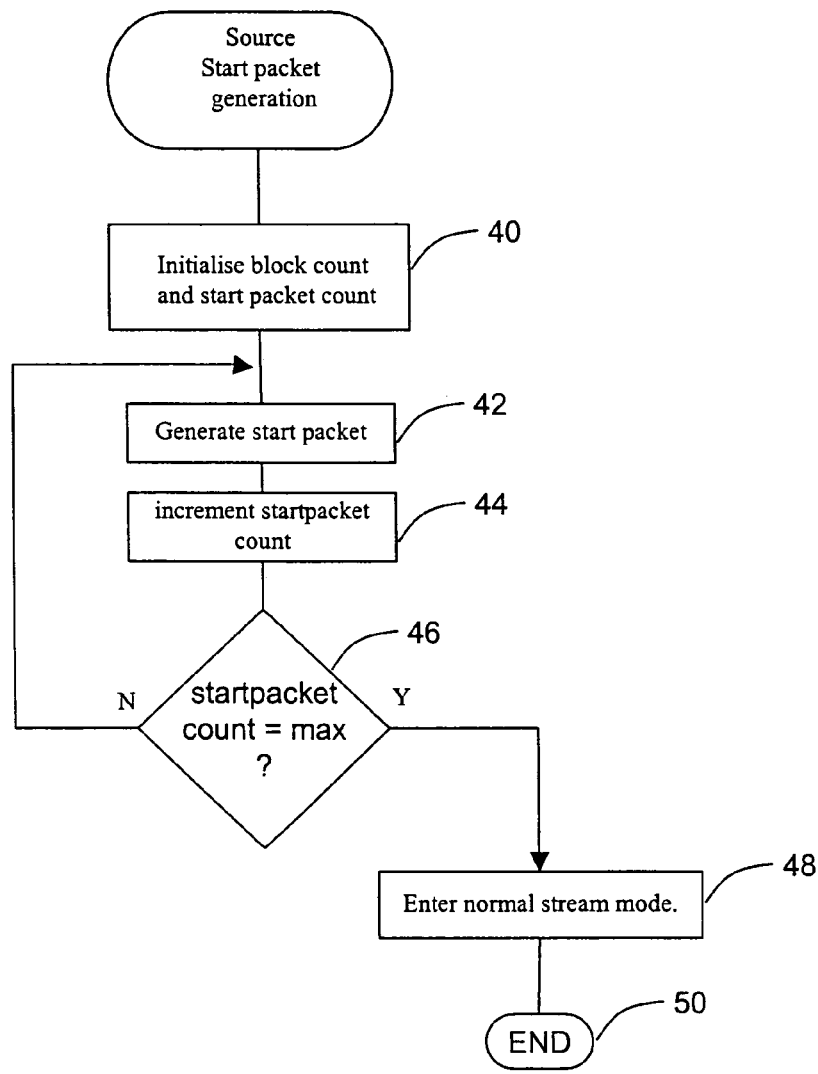
FIG. 5 shows new processes carried out in a video server which sends a flow of packets to an ADSL customer.

FIG. 5 shows a new process undertaken by content file servers such as video server (FIGS. 1-26) and other sources of content files such as streaming media servers accessible to the user via the Internet (FIGS. 1-8). The new process is carried out by the video server or other content file server immediately prior to sending a video (or other data) flow.

The process begins with the initialisation of a block count variable and a start packet count variable to zero (step 40). Thereafter, a start packet is generated having the format shown in FIG. 2. It will be realised that in this case that the message type byte will be set to the value 01, the rate advisory value will indicate the rate at which the file is to be sent from the video or other content file server and the Policy Parameter will be set by the operator of that server. The other values in the IP header will be generated in a conventional manner.

Next, in step 44, the start packet count variable is incremented by one. A test (step 46) is then carried out to find whether the start packet count variable has reached a predetermined maximum value (normally equal to 2). If the start packet count has not reached that value then steps 42 and 44 are repeated. If, on the other hand, the maximum value has been reached then the content file or media file to be streamed is served from the server in the conventional manner (step 48). It is to be understood that each packet of the flow following the start packet (FIG. 2) contains the same source address, destination address, source port, destination port, and TOS field as those found in the start packet. This set of five parameters is referred to as a 'flow-ID' hereinafter. The TOS field is included in the flow-ID so as to allow the present embodiment to distinguish between, say, audio and video components of a given communication. Once the entire file has been sent, the serving process ends (step 50).

FIG. 6A shows a policy table stored at the broadband access node (FIGS. 1-6). The table includes one or more sets of flow-ID parameters (the five leftmost parameters). For each of those sets of flow-ID parameters a time condition may be specified. Finally, the rightmost column of the table gives a Policy Parameter whose values correspond to those described above in relation to the Policy Parameter of the options field of the start packet (FIG. 2).

The set top box (FIGS. 1-16) is programmed to enable the user to specify the flow-ID parameters for a given flow and possibly a time at which that flow is to be received together with an indication of the policy which should be applied to that flow by the broadband access node (FIGS. 1-6). Those skilled in the art will be able to write a suitable program to create and maintain such a policy table. The operation of the broadband access node (FIGS. 1-6) in response to entries in the policy table will be explained below.

FIG. 6B shows a destination IP address list stored at the broadband access node (FIGS. 1-6). The destination IP address list contains an entry for each IP address assigned to each customer terminal (e.g. the PC 10 and the digital television 15) and the associated customer number.

FIGS. 7 and 8 show two tables stored at the broadband access node (FIGS. 1-6) in relation to each customer. In FIG. 7, the eight columns indicate eight customer specific variables, and the second row of that table indicates the initial value of those variables.

The vulnerable flow list (FIG. 8) contains a list of flow-ID's as described above in relation to FIG. 6A and seven variables associated with each flow-ID. The usage of each of these variables will be explained below.

The additional processes running in the broadband access node (FIGS. 1-6) to implement the first embodiment of the present invention will now be explained with reference to FIGS. 9A to 18.

The buffer component 6.1 generates (FIG. 9A) alarms indicating the level of buffer fill to the controller 6.3. The buffer component 6.1 first receives a buffer fill level signal at a regular interval which is sufficiently short to result in the buffer state being accurately tracked by the controller 6.3 (step 60). On such a signal being received, the buffer fill level is compared to an upper alarm threshold (step 62). If the buffer fill level is greater than the upper alarm threshold then an upper threshold buffer alarm is sent to the controller 6.3 (step 64). If, on the other hand, the buffer fill level is lower than the upper alarm threshold then a further test is carried out (step 68) to establish whether the buffer fill is greater than the lower alarm threshold. If the buffer fill is greater than the lower alarm threshold then a lower threshold buffer alarm is sent to the controller 6.3 (step 70). On the other hand, if the buffer fill level is less than the lower alarm threshold then the buffer alarm off signal is sent to the controller 6.3 (step 72). In each case, once the buffer alarm message has been sent (steps 64, 70, 72) the process terminates until the receipt of another buffer fill level signal.

Figure 9A:
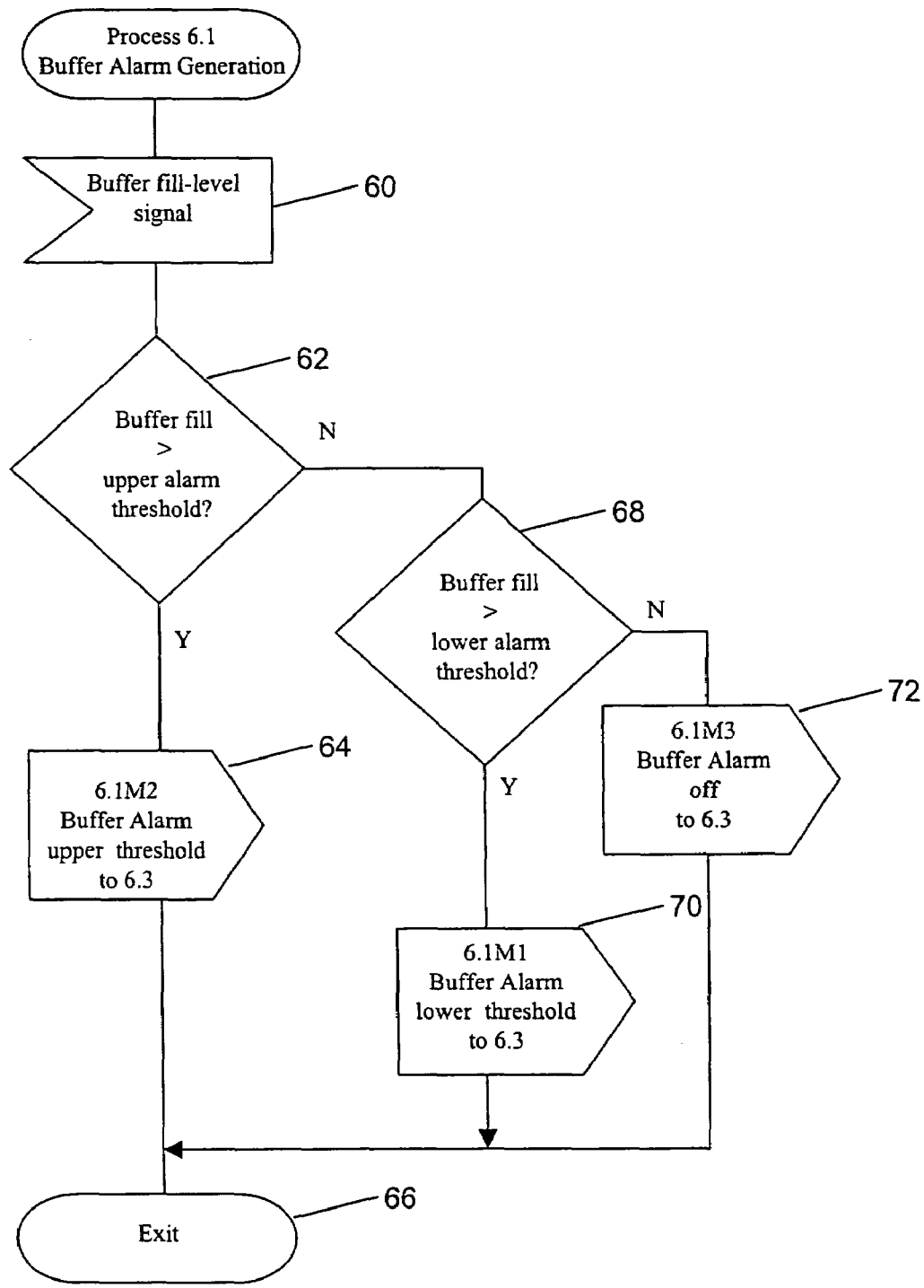
FIGS. 9A, 9B, 9C, 9D, 9E, and 9F show processes carried out responsive to either of two preset buffer fill thresholds being exceeded.
Figure 9B:
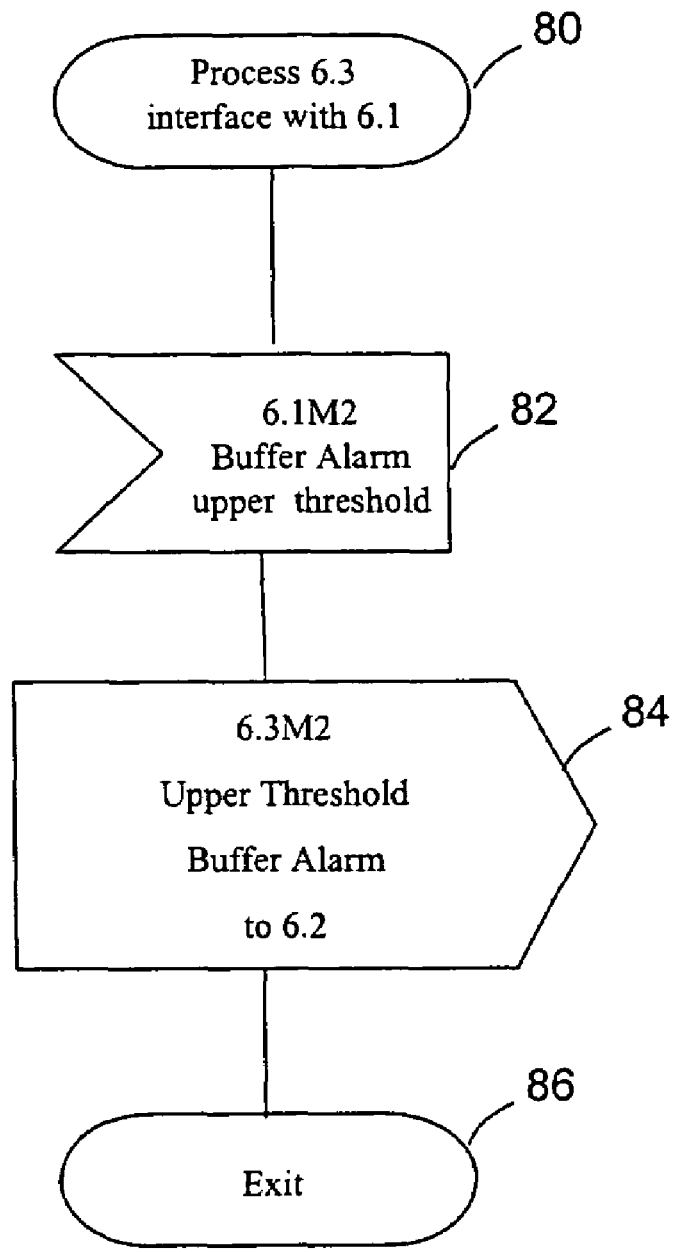
Figure 9C:
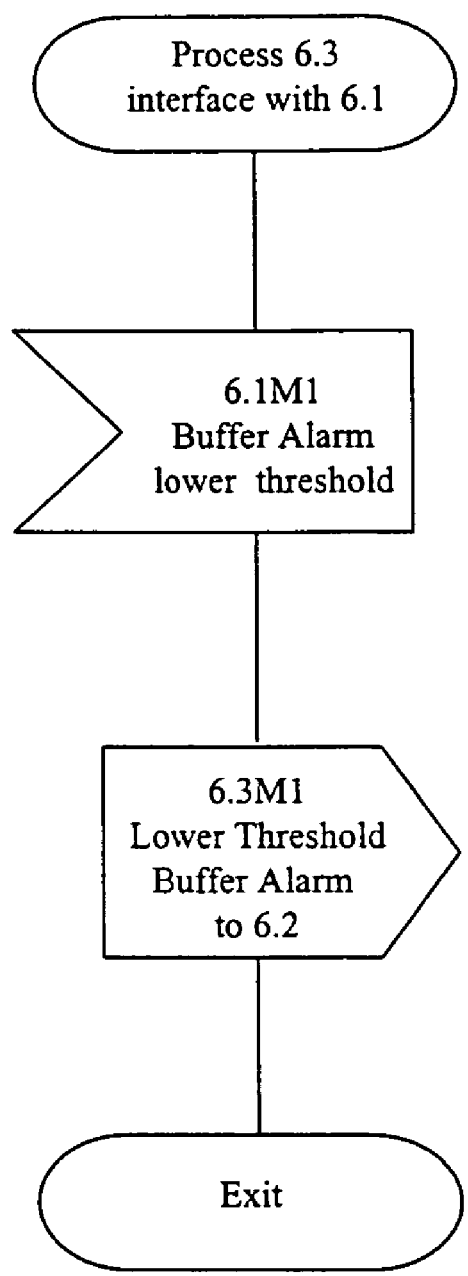
Figure 9D:
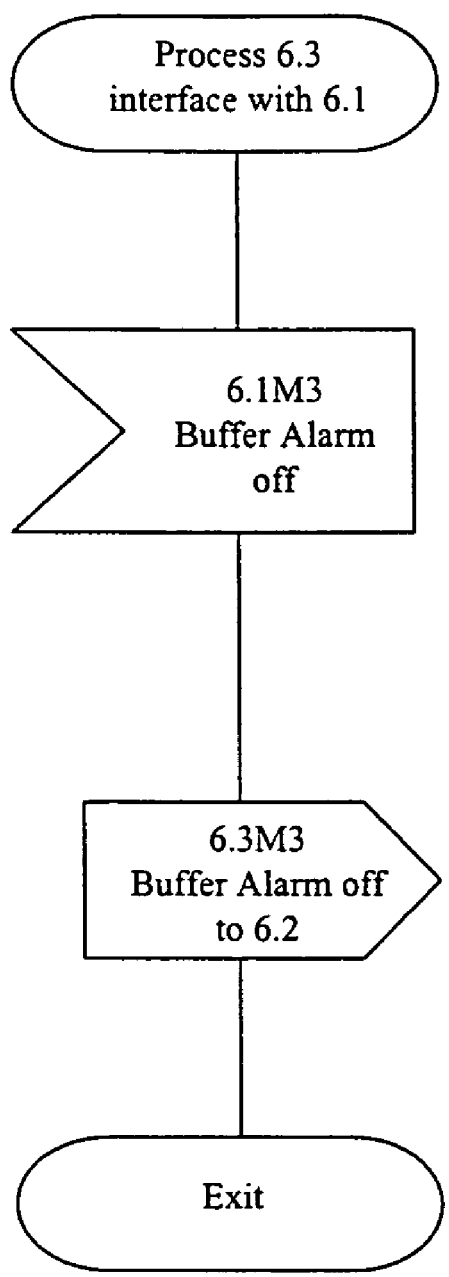
Figure 9E:
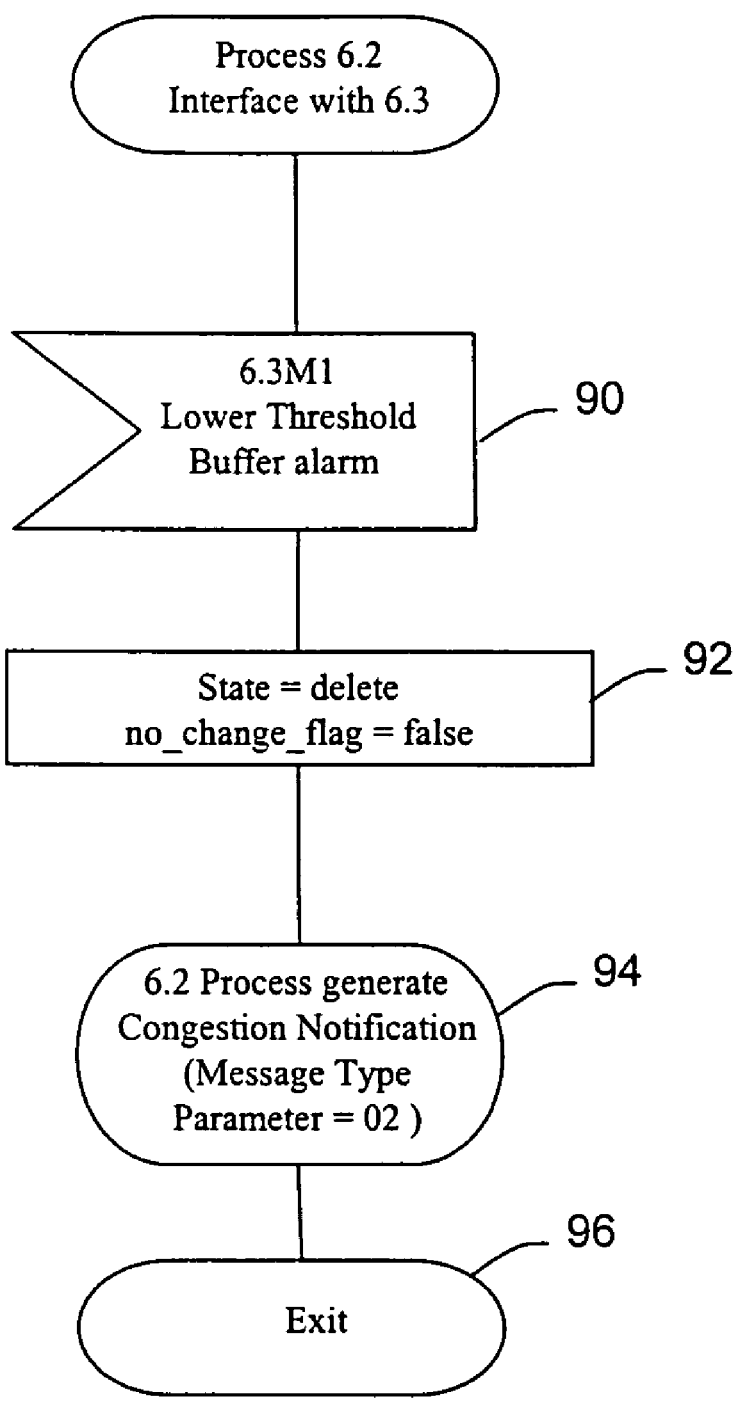
Figure 9F:
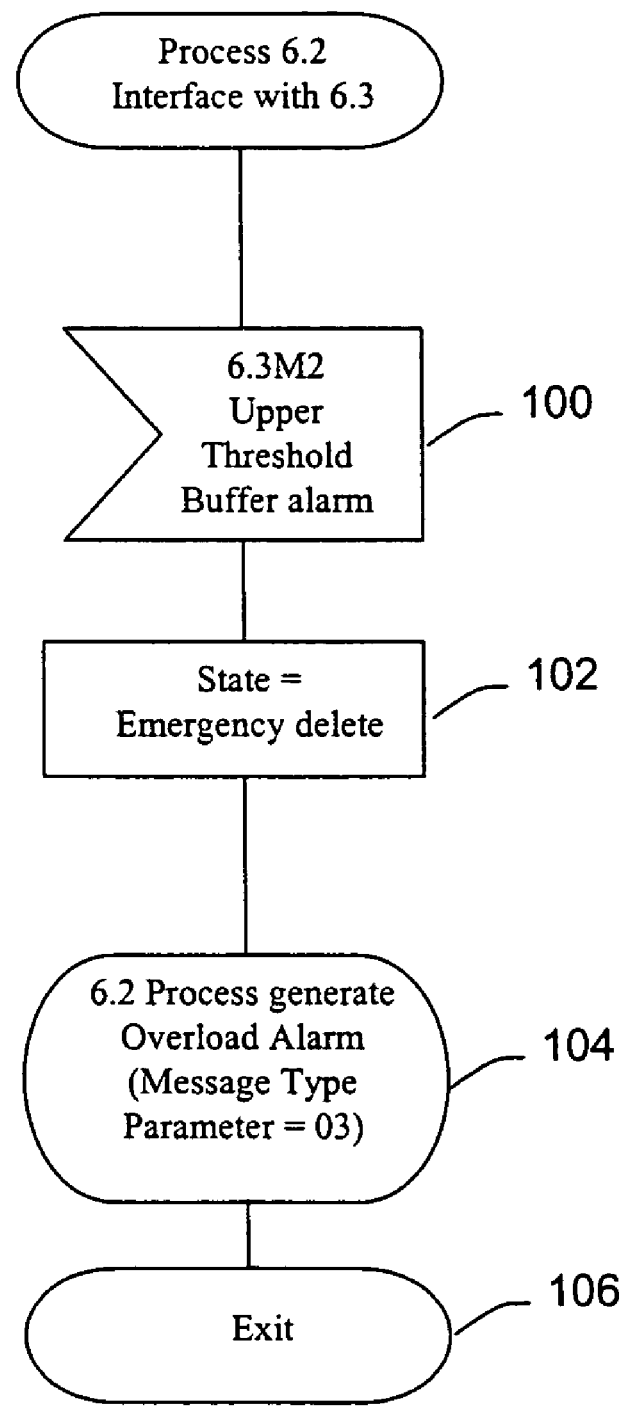

On receiving a buffer alarm upper threshold signal from the buffer 6.1 (FIG. 9B—82), the controller 6.3 forwards the upper threshold buffer alarm to the packet handler 6.2 (step 84). The alarm forwarding process then ends (step 86). FIGS. 9C and 9D show that similar forwarding processes are undertaken on receiving a lower threshold buffer alarm message (FIG. 9C) and on receiving a buffer alarm off message (FIG. 9D).

On receiving the lower threshold buffer alarm forwarded to controller 6.3 (step 90), the packet handler 6.2 changes its record of the buffer state variable (FIG. 4) to "delete" and sets the no change flag (FIG. 7 third column) for the customer to which it relates to false (step 92). Thereafter, the packet handler generates a congestion notification message by sending a control packet formatted in accordance with FIG. 2 with the message type parameter set to the value 02 (step 94). The congestion notification packet may be sent to one or both of the content file server and the customer equipment receiving the flow. An application running on the customers receiving equipment maybe programmed to continue receiving data packets from the flow after the receipt of a congestion notification signal or may be programmed to close down the application and indicate that the network is busy to the user.

If an application is programmed to close down on receipt of the Congestion Notification signal then it is responsible for sending the appropriate signals to the source end to shut down the flow. These procedures are outside the scope of this invention and will vary from application to application. However, an option exists to send a Congestion Notification signal towards the source as well as the destination, if it is acceptable that the source end is responsible for making the decision whether to shut down or not.

On receiving a upper threshold buffer alarm from the controller 6.3 (FIG. 9F—step 100), the packet handler changes its record of the buffer state to "emergency delete" (step 102). Thereafter, the packet handler generates an overload alarm which is a control packet (FIG. 2) which has the message type parameter set to the value 03 (step 104). The process then ends (step 106).

Figure 10:
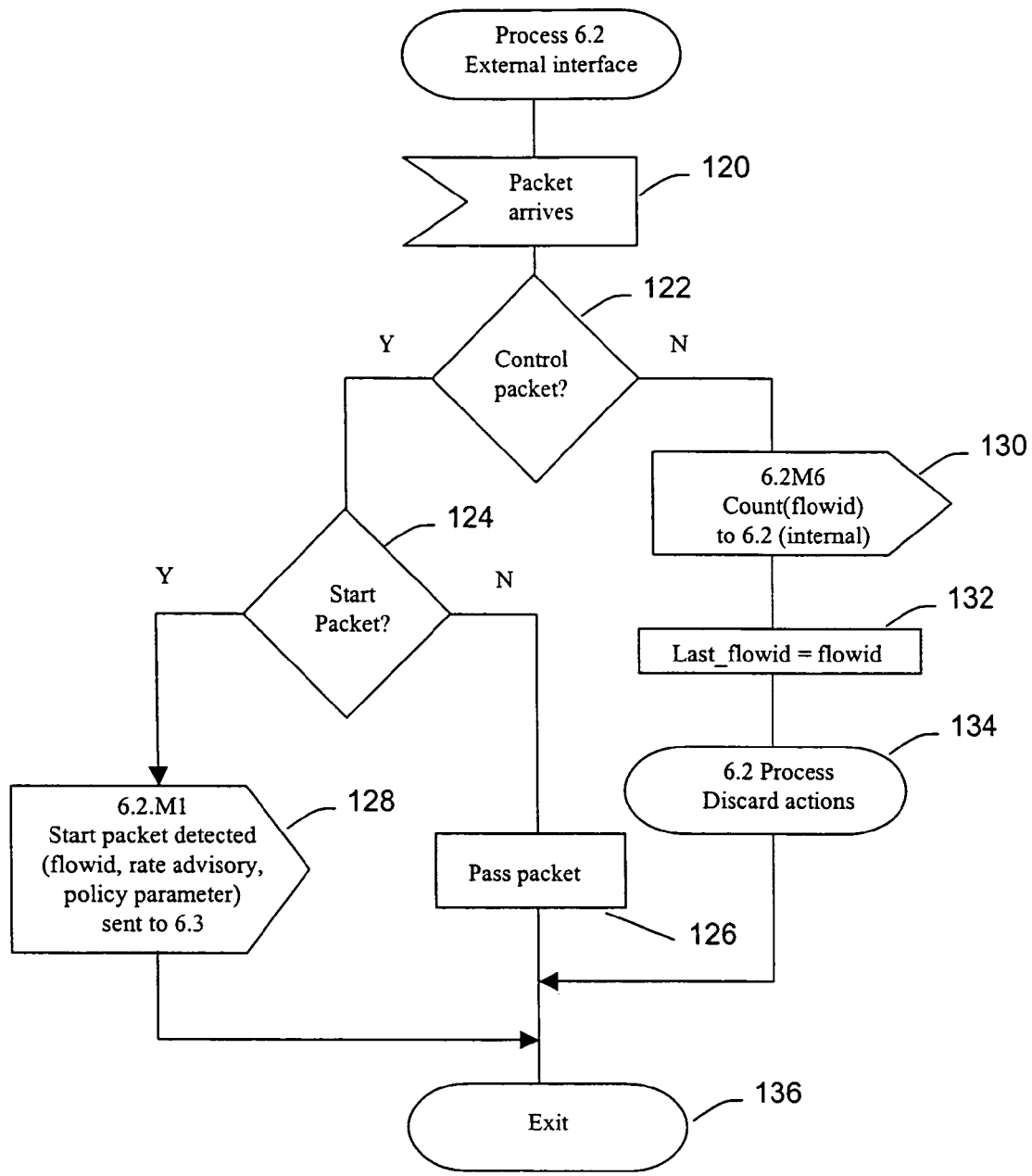
FIG. 10 shows a packet arrival handling process carried out at the broadband access node of FIG. 1.

FIG. 10 shows a packet arrival handling process carried out by the packet handler 6.2. On a packet arriving at the packet handler 6.2 (step 120), a check is first made to see whether it is a control packet for use in the present embodiment (step 122). This is achieved by first investigating whether the packet has a header length of more than 20 bytes and if it does, investigating whether one of the option codes in the header extension is equal to the option code assigned to the present embodiment.

If the packet is identified as a control packet for use in the present embodiment, a further test (step 124) is carried out to establish whether the packet in question is a start packet. This is achieved by investigating the message type byte of the option field to see if it has the value 01. If it does have the option 01 then the packet is identified as a start packet and indication that a start packet has been detected is sent (step 128) to the controller 6.3. The message sent to controller 6.3 includes the set of flow-ID parameters (i.e. source address, destination address, source port, destination port, and TOS field) found in the start packet along with the values from the Rate Advisory and Policy Parameter bytes of the option field of the start packet. The process carried out by the controller 6.3 responsive for the receipt of the message is described below with reference to FIG. 11. If the packet is found to be a packet other than a control packet then it is simply forwarded towards its destination (step 126). The packet arrival handling process then ends (step 136).

If the test to establish whether the packet that has arrived is a control packet (step 122) reveals that the packet is not a control packet then a message informing a token bucket process of the arrival of the packet is generated (step 130). The message includes the flow-ID of the flow to which the packet belongs and is used to update a per-flow token bucket as will be described in more detail below with reference to FIG. 15A.

Next, in step 132, the 'last flow-ID' variable stored for this customer (FIG. 7A rightmost column) is updated to equal the flow-ID of the flow to which the recently arrived packet belongs. Once this has been done, the packet handler 6.2 carries out a process which either discards or forwards the packet (step 134) as will be described in more detail with reference to FIG. 15B below. The packet arrival handling process then ends (step 136).

Figure 11:
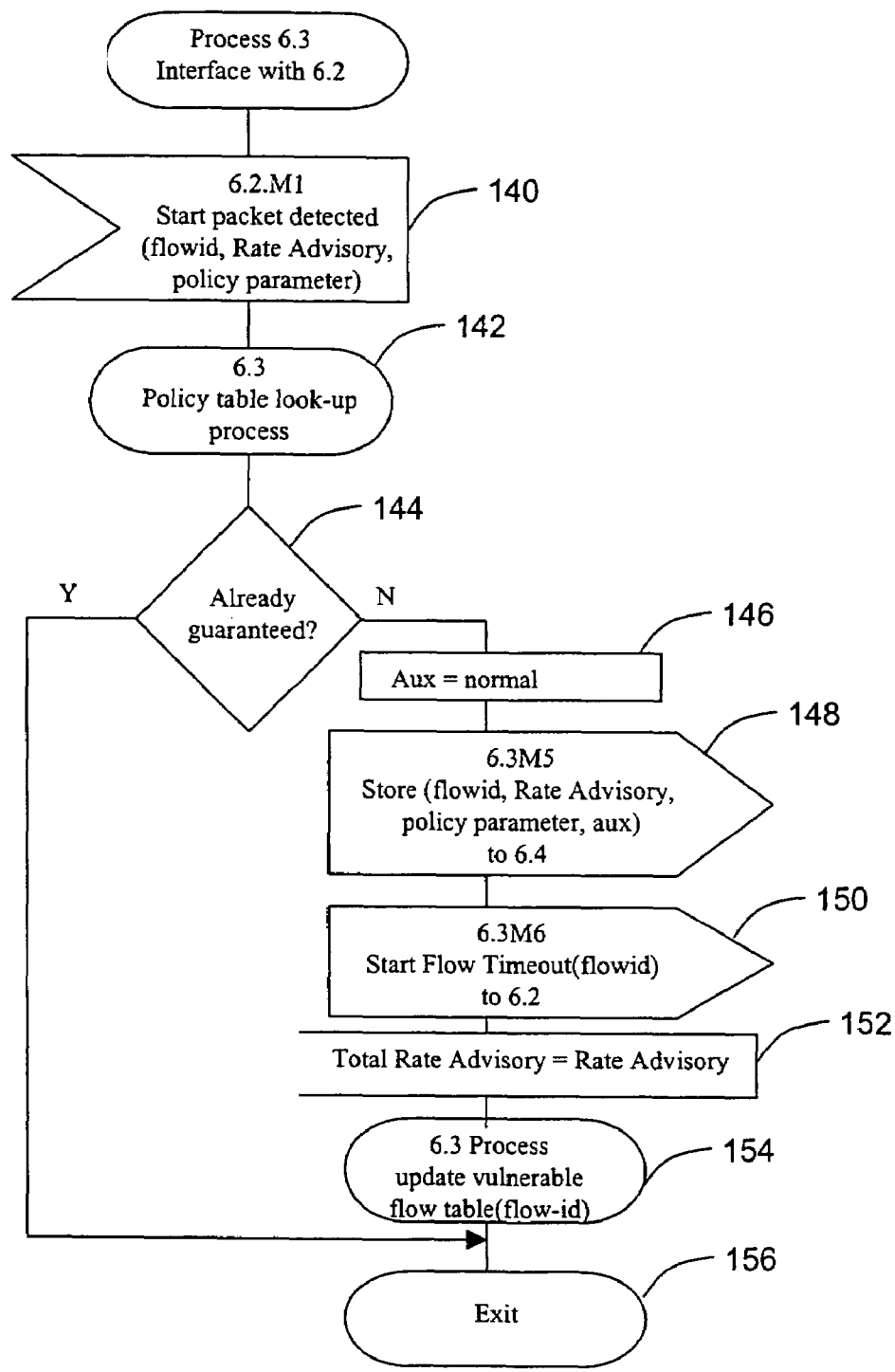
FIG. 11 shows processes carried out upon detection of a start packet.

Turning now to FIG. 11, on receiving the "start packet detected" message from the packet handler 6.2 (step 140) the controller 6.3 carries out a policy table look up process (step 142). Here the controller 6.3 is controlled to search the policy table (FIG. 6A) for an entry which corresponds to the flow-ID obtained from the start packet. If an entry is found in the policy table (FIG. 6A) then the Policy Parameter for the flow found in the start packet is updated accordingly. If no such entry is found, then the Policy Parameter found in the start packet is maintained.

Following the policy table look up process a test is carried out to find whether the Policy Parameter for the present flow equals "guaranteed" (step 144). If the flow's Policy Parameter is set to guaranteed then the start packet arrival handling process (FIG. 11) ends (step 156).

If, on the other hand, the Policy Parameter of the present flow is other than "guaranteed" then control passes to step 146 where the "aux" value for present flow is set to the value "normal". Once this has been done, a message is sent from the controller 6.3 to the flow parameter store 6.4 (step 148) to cause the flow parameter store 6.4 to store the flow-ID, Rate Advisory, Policy Parameter and aux value associated with the received start packet. The processing carried out on receipt of that message will be described in more detail below with reference to FIG. 12, but it is to be noted that the sending of the message results in an entry being made in the vulnerable flow list (FIG. 8) associated with the customer to whom the flow is directed.

Next, in step 150, a message is sent from the controller 6.3 to the packet handler 6.2 instructing it to start a timeout process in relation to this flow. The timeout process will be described in more detail below with reference to FIGS. 13A, 13B and 13C.

The Total Rate Advisory (for the current customer) is then set to value found in the Rate Advisory byte within the recently received start packet (step 152). Thereafter, the controller carries out process Update Vulnerable Flow Table (step 154) before the start packet arrival handling process ends (step 156).

Figure 12:
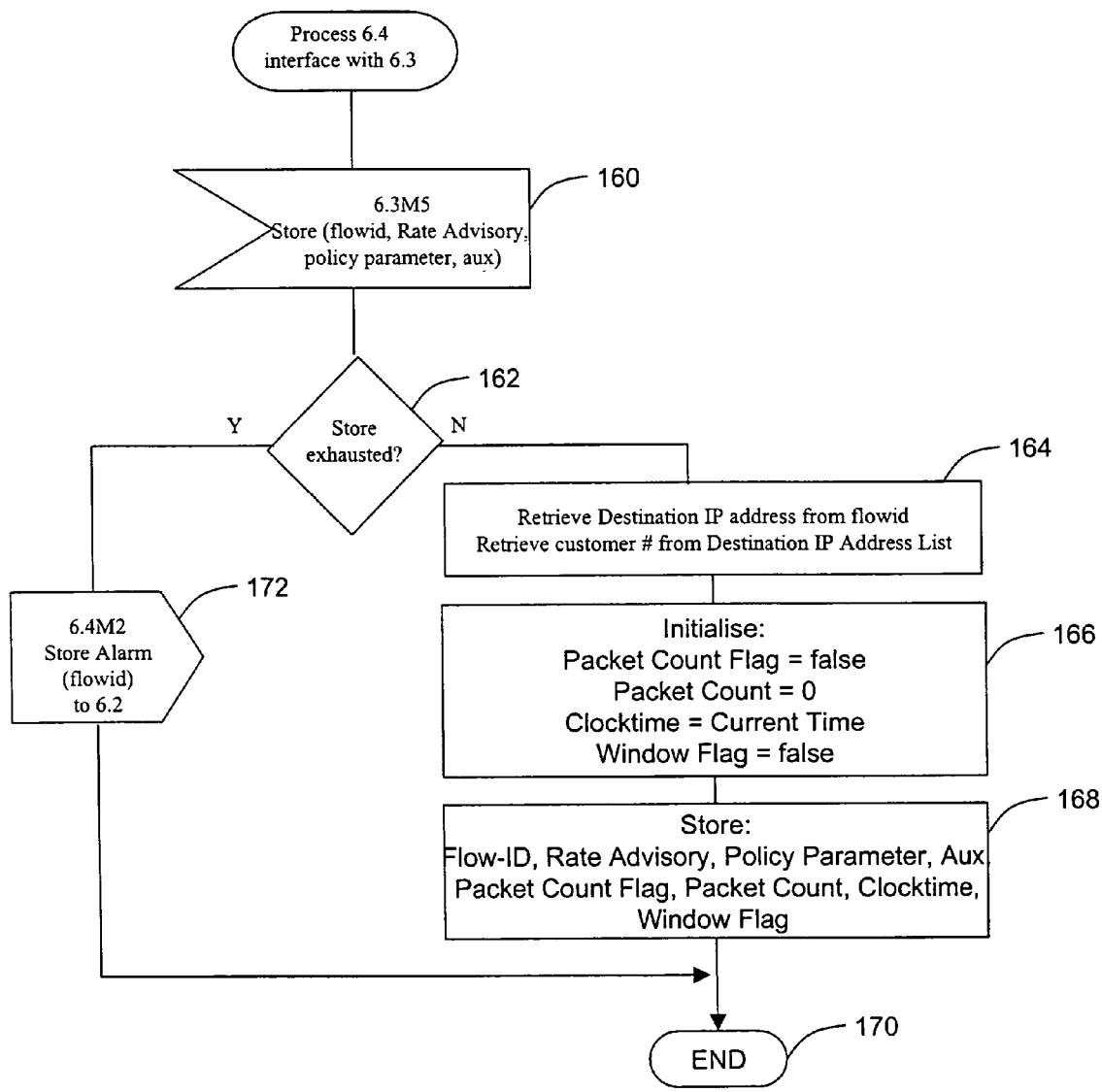
FIG. 12 shows a process for entering a flow record into the vulnerable flow table of FIG. 8 responsive to the receipt of a start packet at the broadband access node.

The actions carried out by the flow parameter store 6.4 on receiving the store instruction sent in step 148 are shown in FIG. 12. On receiving the instruction to store details related to the newly arrived start packet (step 160), the flow parameter store 6.4 first checks to see whether the number of flows stored in the vulnerable flow table (FIG. 8) is greater than the predetermined maximum (step 162). If that maximum is exceeded, then the flow parameter store 6.4 sends a store alarm with an indication with the flow-ID that has triggered the store alarm to the packet handler 6.2 (step 172). The start packet parameters storing process then ends (step 170).

If, on the other hand, the vulnerable flow table (FIG. 8) has less than the maximum number of entries then the flow parameter store 6.4 operates to find the customer number of the customer to which the flow is directed (step 164). This is achieved by searching the destination IP address table (FIG. 6B). The four remaining values that need to be set to complete the flow entry in the vulnerable flow list (FIG. 8), namely the packet account flag, packet count, clocktime and Window Flag are assigned the initial values "false", 0, the current time as measured by the system clock and "false" respectively (step 166). The values of all of the flow parameters are then entered (step 168) into the vulnerable flow list (FIG. 8). The start packet parameters storing process then ends (step 170).

Returning to FIG. 11, it will be seen that the arrival of a start packet causes an entry to be made in the vulnerable flow table (FIG. 8) provided only that the Policy Parameter within the packet or within the policy table (FIG. 6A) is not set to "guaranteed".

Figures 13A, 13B:
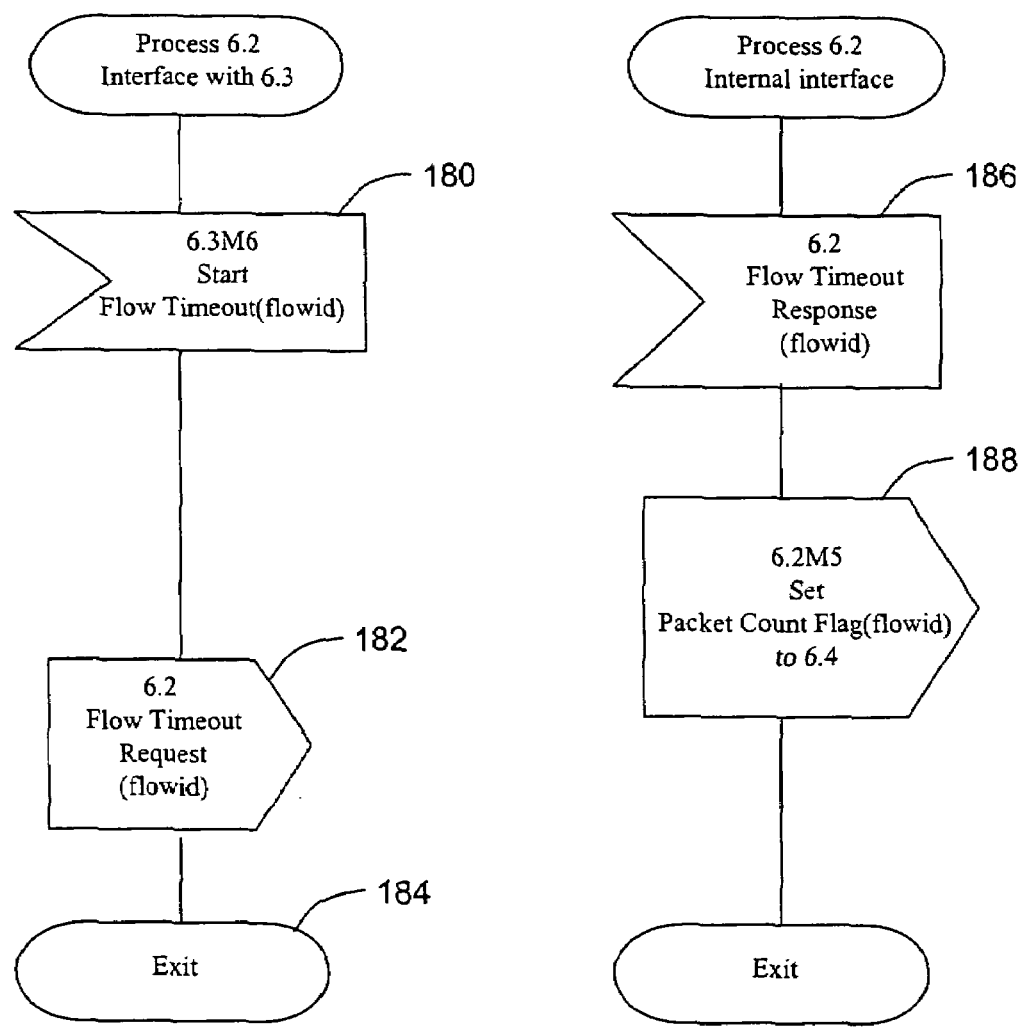
FIGS. 13A, 13B and 13C show the per-flow packet counting process which forms part of the packet arrival handling process of FIG. 10.
Figure 13C:
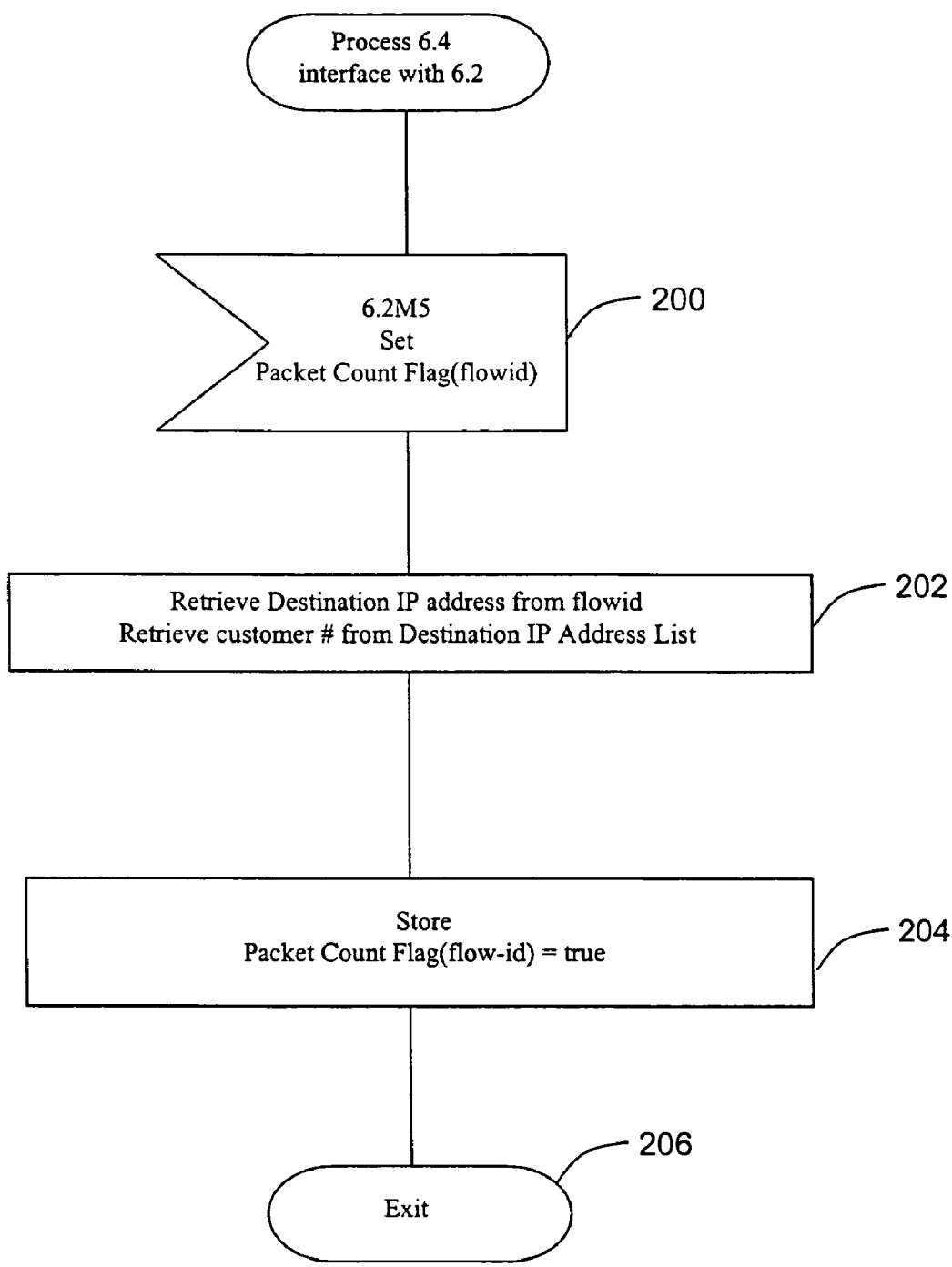

The response of the packet handler 6.2 to the start flow timeout instruction (FIG. 11—step 150) is illustrated in FIGS. 13A, 13B and 13C. On receiving the start flow time out instruction from the controller 6.3 (step 180), the packet handler 6.2 sends a flow timeout request to a timing function (step 182). The timing function is effective to respond with a flow timeout response (received in step 186) after the expiry of a period of a few hundred seconds. Following the receipt of that response, the packet handler 6.2 sends a 'set packet count flag' instruction (step 188) to the flow parameter store 6.4.

On receiving the set packet count flag instruction (FIG. 13C—step 200), the flow parameter store 6.4 derives (step 202) the customer number from the flow-ID in a similar manner to that explained above in relation to the start packet parameters storing process (FIG. 12). Using the customer number to locate the correct vulnerable flows table (FIG. 8) the flow parameter store 6.4 then sets the Packet Count flag for the flow-ID in question to true (Step 204).

Returning now to FIG. 11 it will be seen that having made an entry in the vulnerable flows table (FIG. 8) responsive to the arrival of a start packet of a non guaranteed flow, the packet count flag variable in that flow entry is initially set to false but will be reset to true after a period of several hundred seconds following the timeout process described above (FIGS. 13A to 13C).

The process update vulnerable flows table (activated in response to the receipt of a start packet announcing the start of a non-guaranteed flow—FIG. 11 step 154) will now be explained in greater detail with reference to FIGS. 14A to 14G. Firstly, (FIG. 14A—step 210), the controller 6.3 issues (step 210) instructions to the flow parameter store 6.4 to return the parameters of the most recent flow included in the vulnerable flows table (FIG. 8) associated with this customer.

On receiving the request for the parameters of the receiving flow (FIG. 14B—step 214), the flow parameter store 6.4 first identifies the customer number associated with the recently arrived flow-ID (step 216) and then searches (step 218) that customer's vulnerable flows table (FIG. 8) for the flow entry whose clocktime most closely precedes the clocktime of the current flow (i.e. the flow which was announced by the start packet whose arrival led to the process update vulnerable flows table being activated). Once that flow entry has been found, the flow-ID, Rate Advisory, aux, and packet count flag fields of that flow entry are sent to the controller 6.3 (step 220).

On receiving (FIG. 14C—step 230), from the flow parameter store 6.4, the parameters of the flow entry in the customers vulnerable flows table (FIG. 8) which corresponds to the next most recently started flow, the controller 6.3 first tests to see whether the flow-ID returned is a null value (step 232). If the value returned is a null value then all flows within the customers vulnerable flow table (FIG. 8) have been investigated and the process update vulnerable flows table (FIGS. 14A to 14G) terminates (step 246). If the value is not a null value then further updates to the vulnerable flows table (FIG. 8) for the current customer are carried out (steps 234 to 244).

Firstly, in step 234, the value of the Policy Parameter of the flow currently being updated is incremented by 1. It will be realised that this has the result that the any flow currently receiving a 'bronze' quality of service will be upgraded to a 'silver' quality of service, and any flow currently receiving a 'silver' quality of service will be upgraded to a 'gold' quality of service. If the flow is raised to guaranteed status then the window flag for the flow entry being considered is set to true.

Then, in step 236, a check is carried out to see whether a flow which is to be considered for guaranteed status should be deleted from the vulnerable flows table (FIG. 8). This 'check window exit criteria' process is described more fully below with reference to FIGS. 14D and 14E.

In step 238, a test is carried out to find whether the window flag for the flow entry being considered is set to 'true'. If it is found that the window flag is in fact set to 'false', then an instruction is sent (step 240) from the controller 6.3 to the flow parameter store 6.4 to delete the flow from the vulnerable flows table (FIG. 8)

On the other hand, if the window flag is found to be set to 'true', then the controller 6.3 sends (step 242) to the flow parameter store 6.4 an instruction to store the updated Policy Parameter for the flow entry currently being considered. Following the deletion (step 240) of a flow from the customer's vulnerable flows table (FIG. 8) or the updating (step 242) of the vulnerable flows table (FIG. 8) to reflect the updated Policy Parameter, the controller 6.3 recursively returns control to the process update vulnerable flow table (FIGS. 14A to 14G). By recursively returning to the process update vulnerable flow table, it will be seen that each of the flow entries in the vulnerable flows table (FIG. 8) is investigated in turn.

Figure 14A:
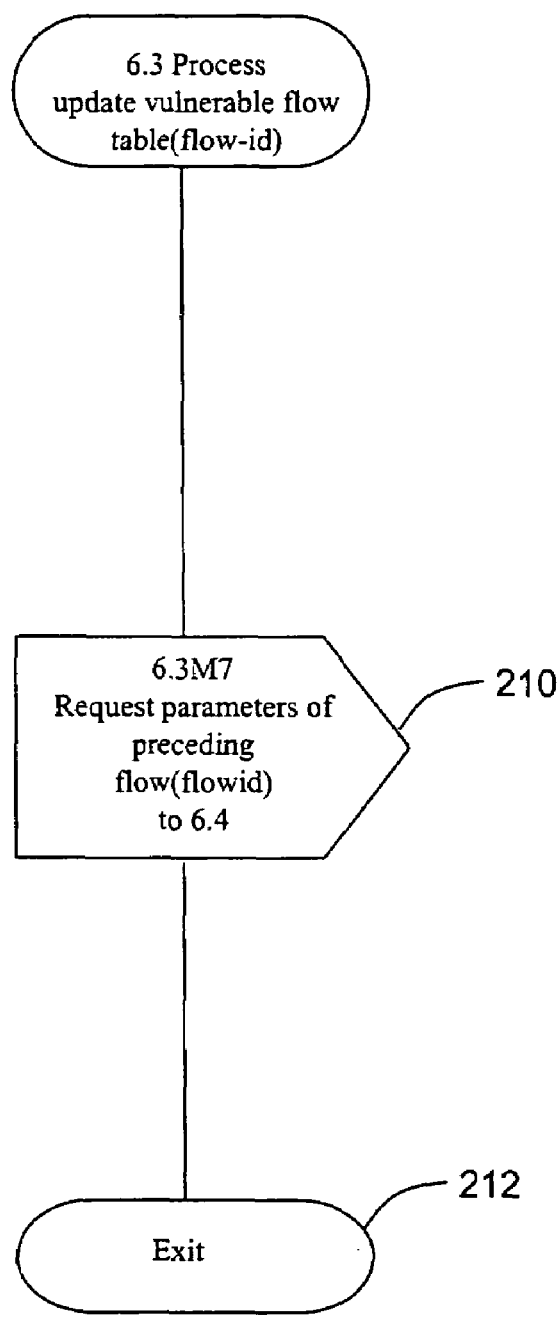
FIGS. 14A, 14B, 14C, 14D, 14E, 14F and 14G show a process for updating other flow records in the vulnerable flow table of FIG. 8 responsive to the commencement of a new flow to the customer.
Figure 14B:
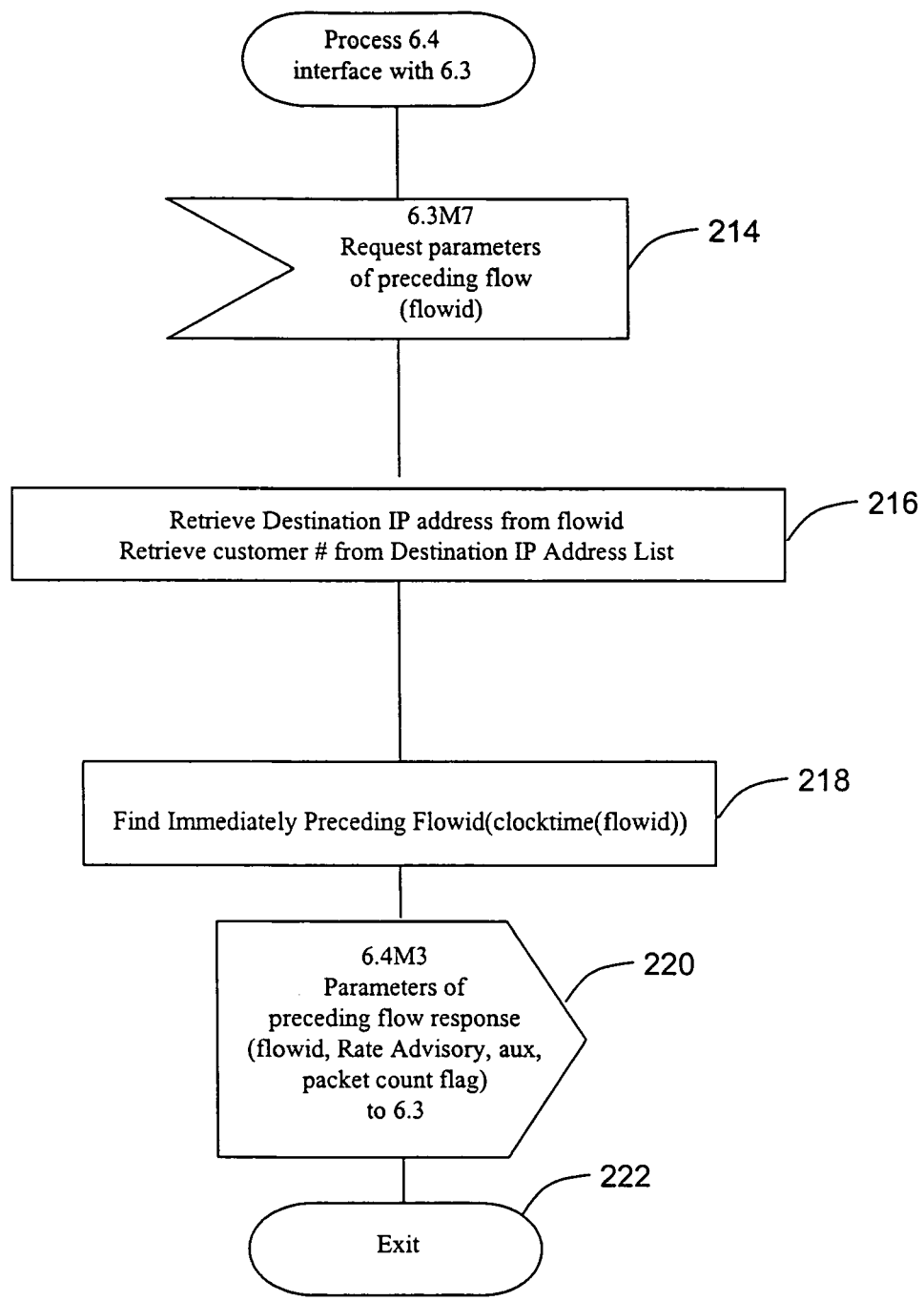
Figure 14C:
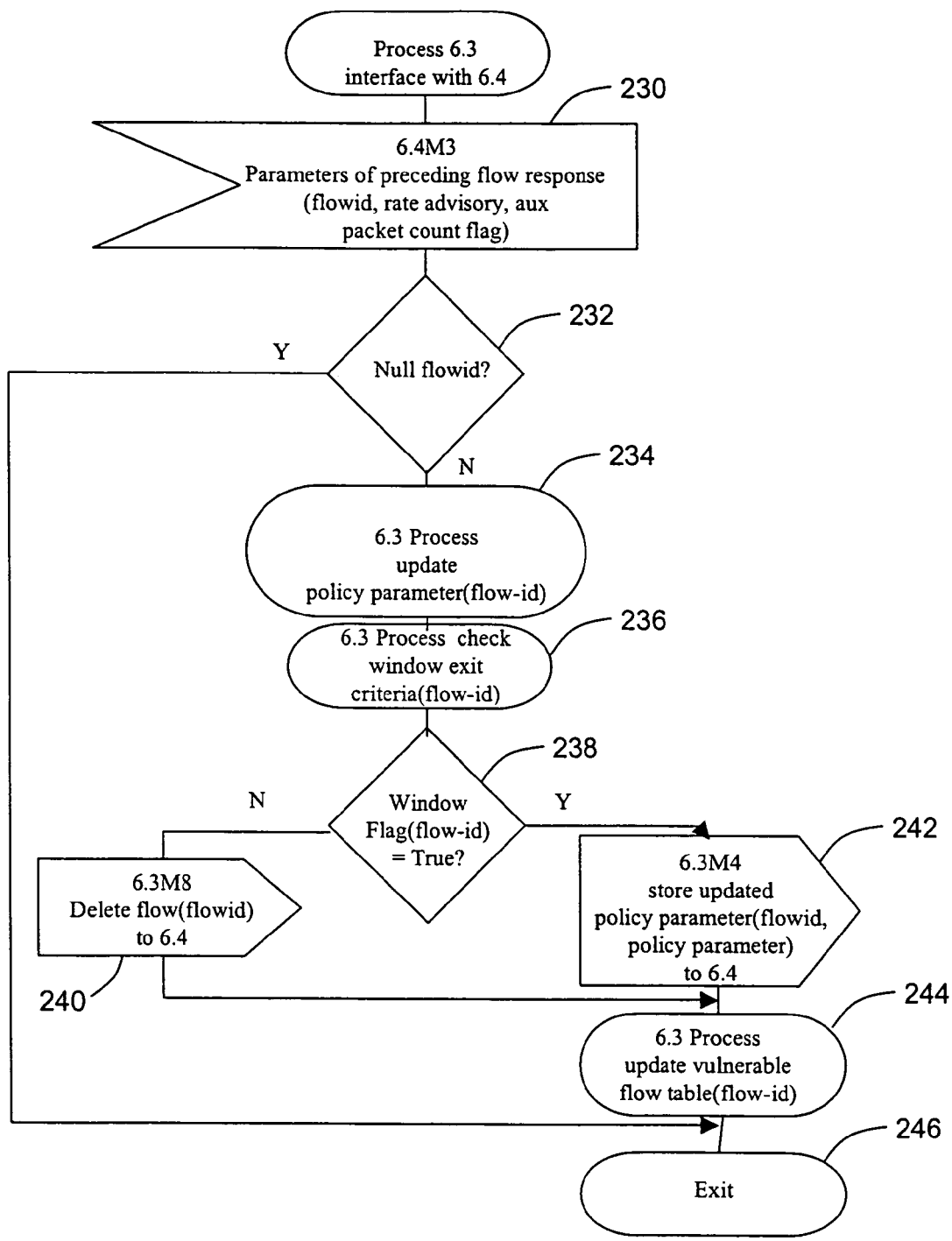
Figure 14D:
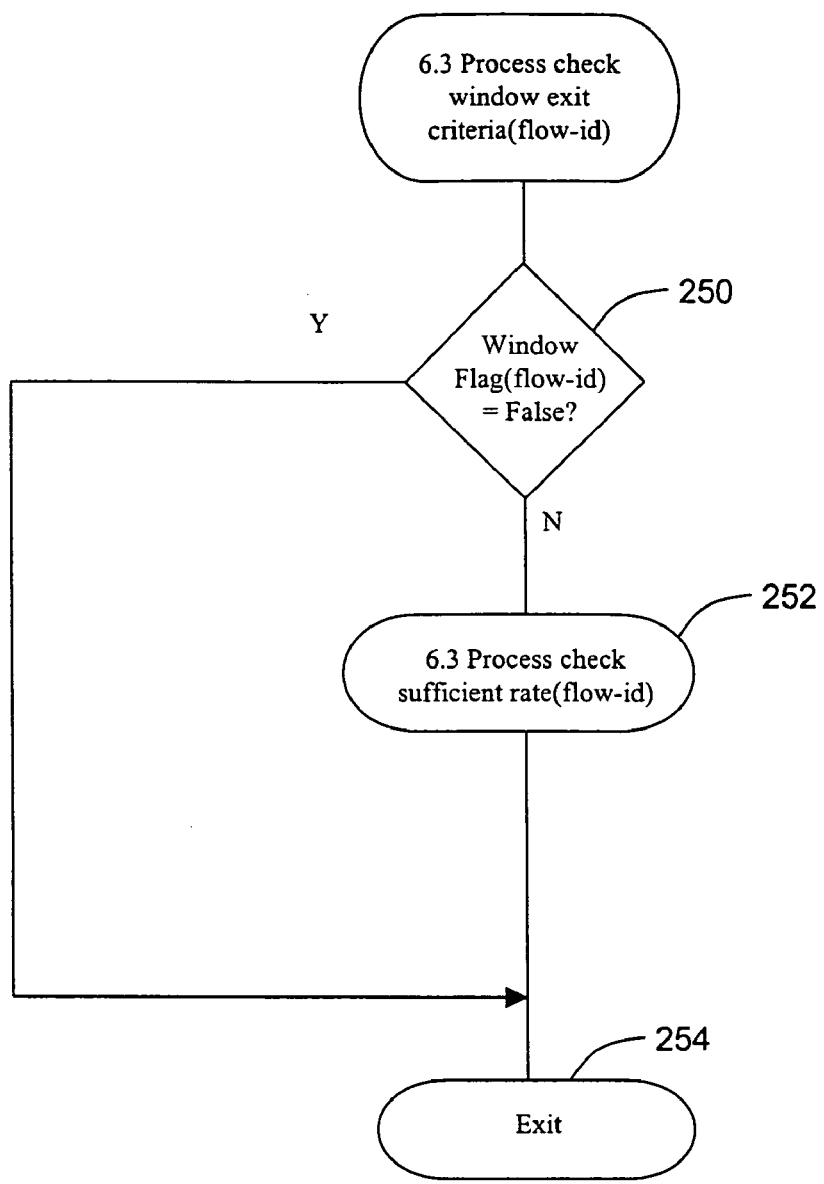
Figure 14E:
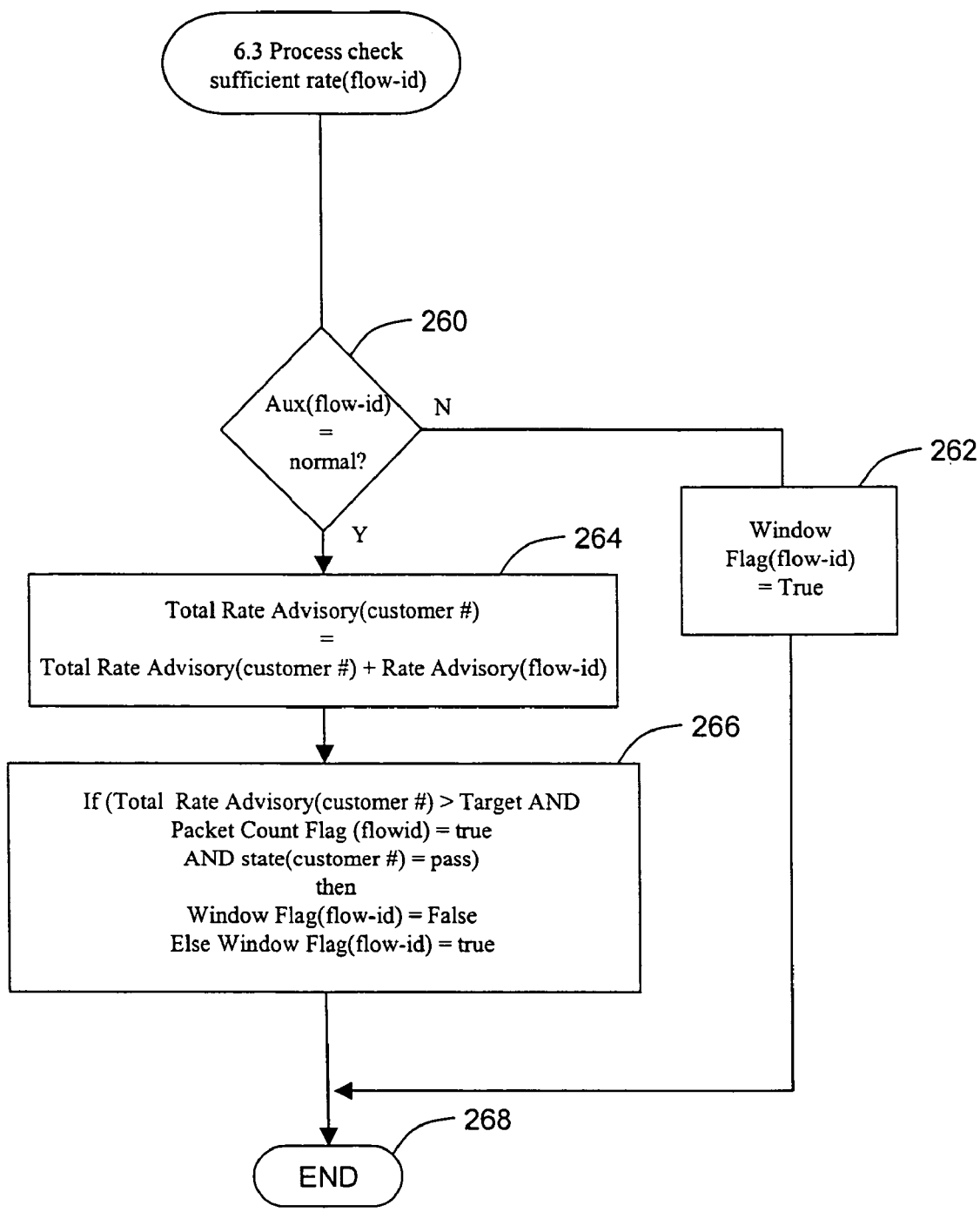

The process check window exit criteria (called in step 236) is illustrated more fully in FIG. 14D. The process begins with a check (step 250) to find whether the window flag is set to false. If the window flag is set to 'false' (i.e. the flow is earmarked for exit from the vulnerable flows table (FIG. 8)) then the process check window exit criteria process terminates at step 254. If, on the other hand, the window flag is set to 'true' then the controller 6.3 carries out the process check sufficient rate (step 252). That process is illustrated more fully in FIG. 14E. Turning now to that Figure, process check precision rate begins with a test (step 260) to see whether the aux variable associated with the flow entry currently being investigated is set to 'normal'.

In some cases (to be explained below), the aux variable will in fact be set to the value 'emergency', in which case the window flag for or the flow entry currently being investigated is set to 'true'. The process check sufficient rate then ends (step 268). If, as is the usual case, the aux variable for the flow entry being considered is set to the 'normal', then the Total Rate Advisory for the current customer is increased by the Rate Advisory associated with the current flow entry (step 264).

Once this update has been carried out a check (step 266) is made to find whether:

a) the cumulative Rate Advisory associated with the flow entries thus far considered is greater than a target value (in the present embodiment of the target value is set to 5% of the capacity of the PVC leading from the broadband access node (FIGS. 1-6) to the user's home network (FIGS. 1-3—i.e. in the present case to 250 kilobits per second));
b) the packet count flag for the current flow is set to 'true'; and
c) the state of the buffer associated with the current customer is 'pass'.

If each of those three conditions is met then the window flag for the current flow is set to 'false'. In other cases the window flag set to 'true'. After the window flag has been set this way, the process check sufficient rate ends (step 268).

Returning to FIG. 14C, it will be seen that the process check window exit criteria (FIG. 14D) is effective to carry out the process check sufficient rate for each flow entry in the vulnerable flows table (FIG. 8) whose window flag was not set to false in the process update policy parameters. Hence, save for flow entries to be removed from the vulnerable flows table for policy reasons, step 264 is carried out for each flow entry in the customer's vulnerable flow table (FIG. 8). It will be remember that the process check sufficient rate forms part of the process update vulnerable flows table which is itself carried out in response to the arrival of a start packet for the customer with whom the vulnerable flows table (FIG. 8) is associated. If the Rate Advisory of the a flow entry is sufficient to carry the cumulative Rate Advisory to a value above 400 kilobits per second then provided that:

a) the flow has been either active or at least in existence for some time (which causes the packet count flag to be set to 'true'; and
b) the buffer of this customer is found not to be overloaded (i.e. provided the buffer state is equal to 'pass') then that flow entry is removed from the vulnerable flows table (FIG. 8). This process is repeated for any preceding flow entries. It will be realised that the effect is to maintain a set of flows in the vulnerable flows table whose cumulative Rate Advisory is as close as possible to 400 kbits$^{-1}$.

Figure 14F:
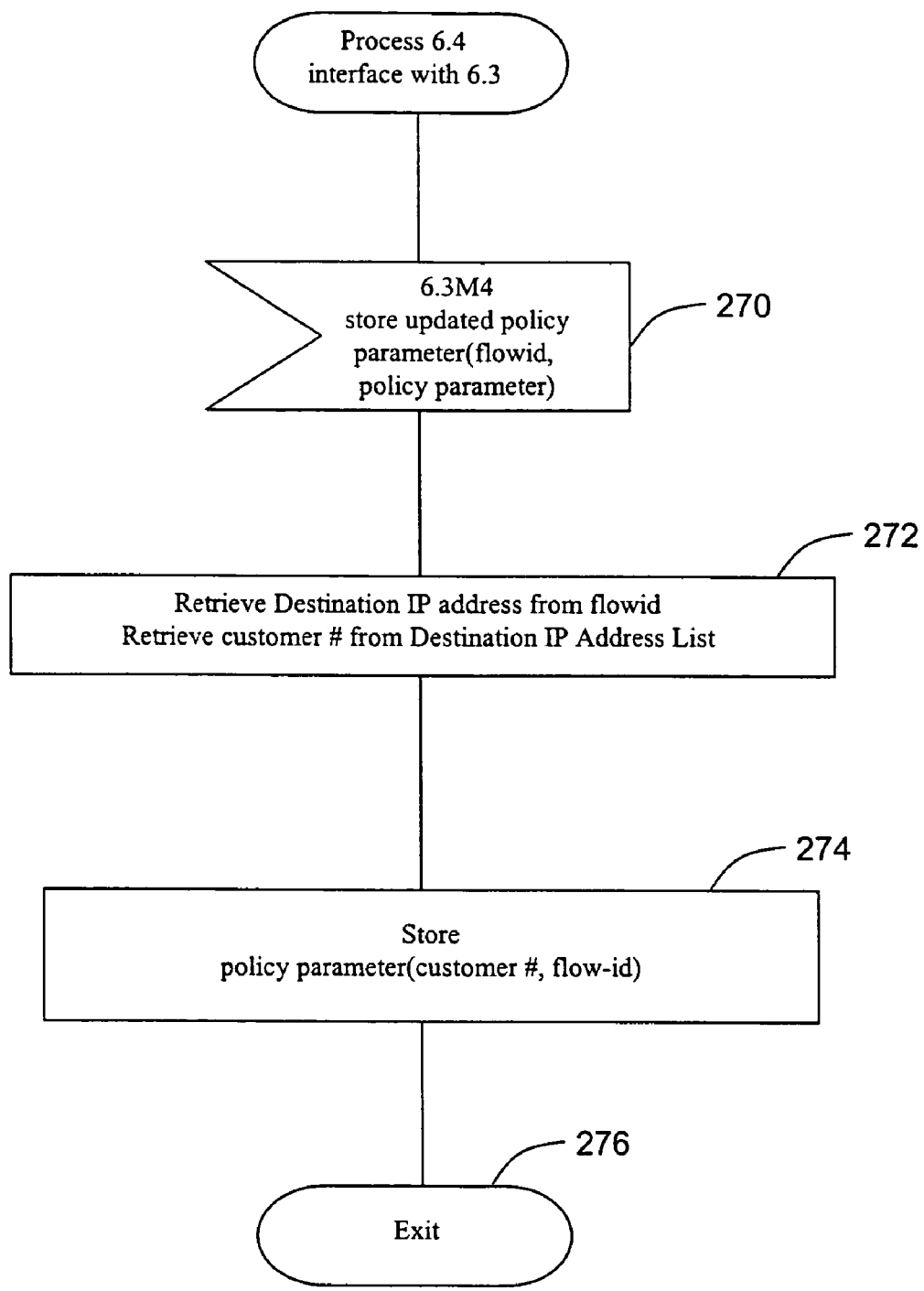

FIG. 14F shows the response of the flow parameters store 6.4 to the receipt (step 270) of the instruction from the controller 6.3 to store the updated Policy Parameter (sent at FIG. 14C—step 242). The instruction is immediately followed by the retrieval of the customer number which corresponds to the destination IP address in the flow-ID (step 272), with the Policy Parameter then being stored in the vulnerable flows table (FIG. 8) containing the flow entry currently under investigation (step 274). The store updated policy parameter process then ends (step 276).

Figure 14G:
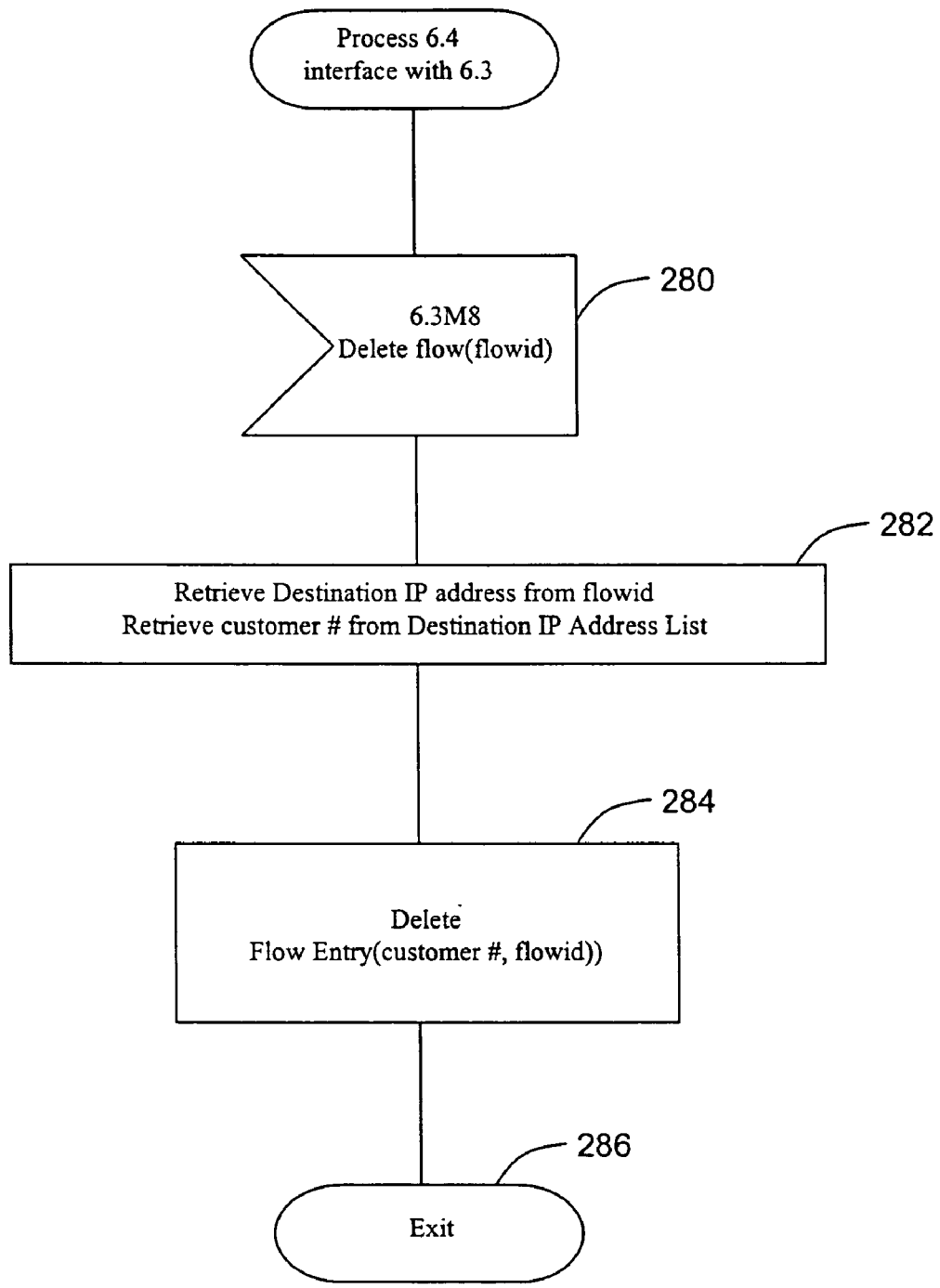

The response of the flow parameter store 6.4 to the delete flow entry instruction from the controller 6.3 (sent at FIG. 14C—step 240) is illustrated in FIG. 14G.

On the flow parameter store 6.4 receiving the delete flow instruction from the controller 6.3 (step 280), the customer number is first retrieved (step 282) using the destination IP address list (FIG. 6B). Thereafter, the flow entry currently being investigated is deleted (step 204) from the vulnerable flows table (FIG. 8). The flow entry deletion process then ends (step 286).

Turning now to FIG. 10, it will be seen that the processes carried out in response to a start packet being detected (step 128) are those described in relation to FIGS. 11 to 14G above. Broadly speaking, the response to the receipt of a start packet is to enter the new flow into the vulnerable flows table for the customer to whom the flow is directed and to update the other flow entries in that table to improve the Policy Parameter associated with them. If the cumulative Rate Advisory of the flows within the table is pushed above a target level by the addition of the new flow, then in normal circumstances, one or more flows is removed from the vulnerable flows table are removed from that table and into the guaranteed area. This has the effect of a flow that has been running for some time comes increasingly less likely to be subject to discard by the packet handler 6.2 and eventually becomes safe from such discard actions—barring the advent of exceptional circumstances to be described below with reference to FIGS. 16A and 16B.

Figure 15A:
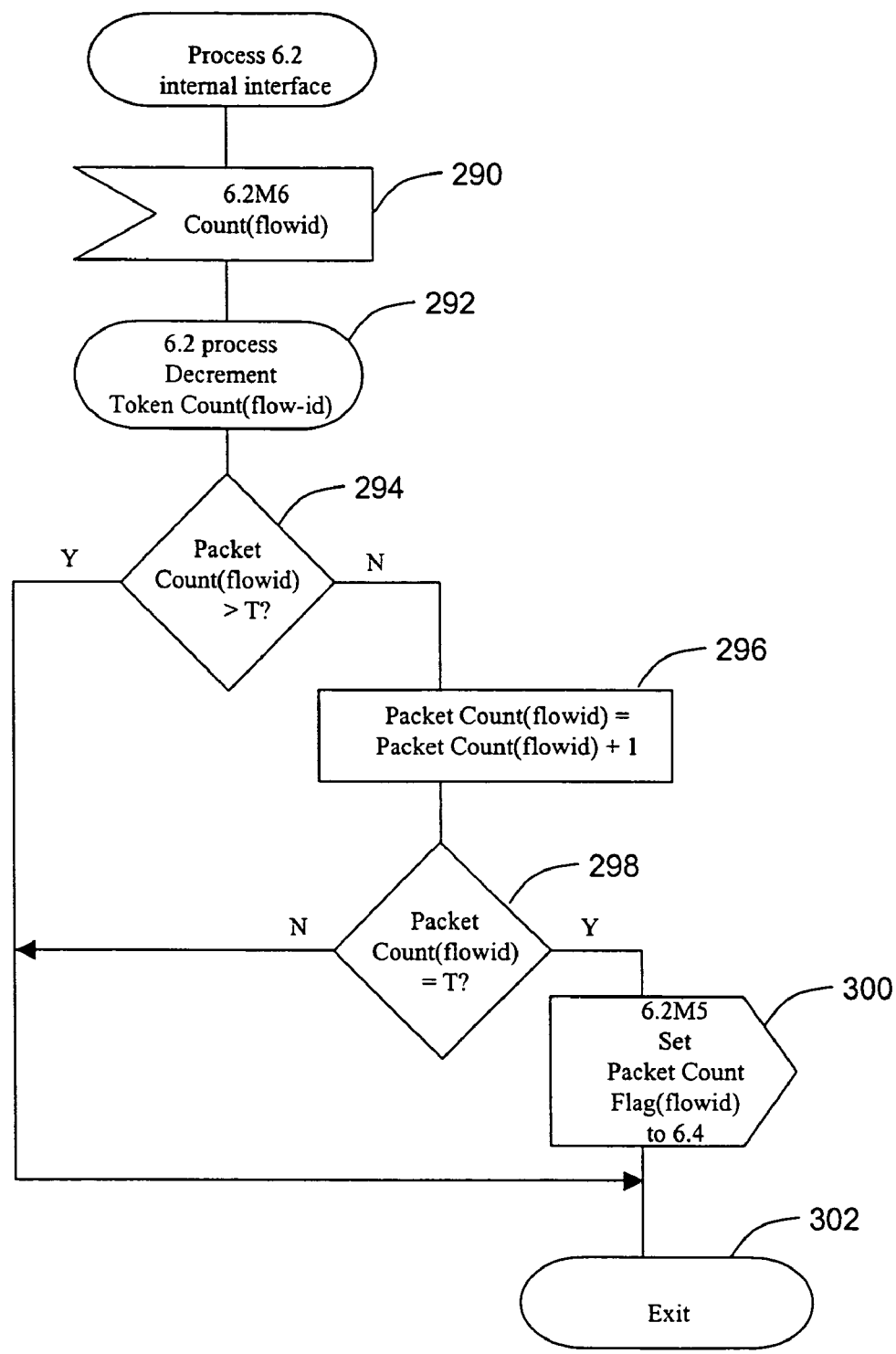
FIGS. 15A, 15B, 15C, 15D, 15E and 15F show processes for handling packets other than start packets.

The response to the count (flow-ID) instruction (the first action carried out by the packet handler 6.2 on receipt of a non-control packet—FIG. 10—step 130) is illustrated in FIG. 15A. The process begins with the receipt of the count (flow-ID) instruction (step 290). Then, in step 292, the token bucket associated with the current flow-ID has one token removed from it. Thereafter, the value of the packet count variable associated with this flow-ID (stored in the vulnerable flows table (FIG. 8—penultimate column)) is compared to a predetermined threshold T (step 294). If the packet count is already greater than that threshold then the packet count update process ends (step 302). If, however, the packet count has not yet reached the predetermined threshold T then the packet count variable is incremented (step 296). Thereafter, a further test (step 298) is carried out to see whether the newly incremented packet count is equal to the predetermined threshold value T. If the new incremented packet count is still not equal to the predetermined threshold T then the process ends (step 302). If, on the other hand, the newly incremented packet count is now equal to the predetermined threshold T then the packet handler 6.2 sends (step 300) an instruction to the flow parameter store 6.4 to set the packet count flag associated with the current flow-ID to 'true'. It will be realised that the response to that message has already been described with reference to FIG. 13C above. Furthermore, it will be realised that the receipt of a threshold number of packets belonging to a newly started flow has the same effect as the expiry of a period of a few hundred seconds from the receipt of the start packet associated with the flow, namely the setting of the packet count flag associated with that flow to 'true'. It will be remembered that the update vulnerable flows table process (FIGS. 14A to 14G) requires the packet count flag to be set to 'true' before the flow entry with which it is associated can be removed from the vulnerable flows table (FIG. 8). This is done to handle a situation where the customer requests so many flows within a short period of time that assessing the impact of the arrival of those flows can no longer be done on a one-flow-at-a-time basis. Ensuring that the flow remains in the vulnerable flows table (FIG. 8), at least until T packets from that flow have been received, affords time for assessing the impact of that flow. To prevent a flow which sends less than T packets from remaining in the vulnerable flows table indefinitely, the timeout process described in relation to FIGS. 13A to 13C is used.

Figure 15B:
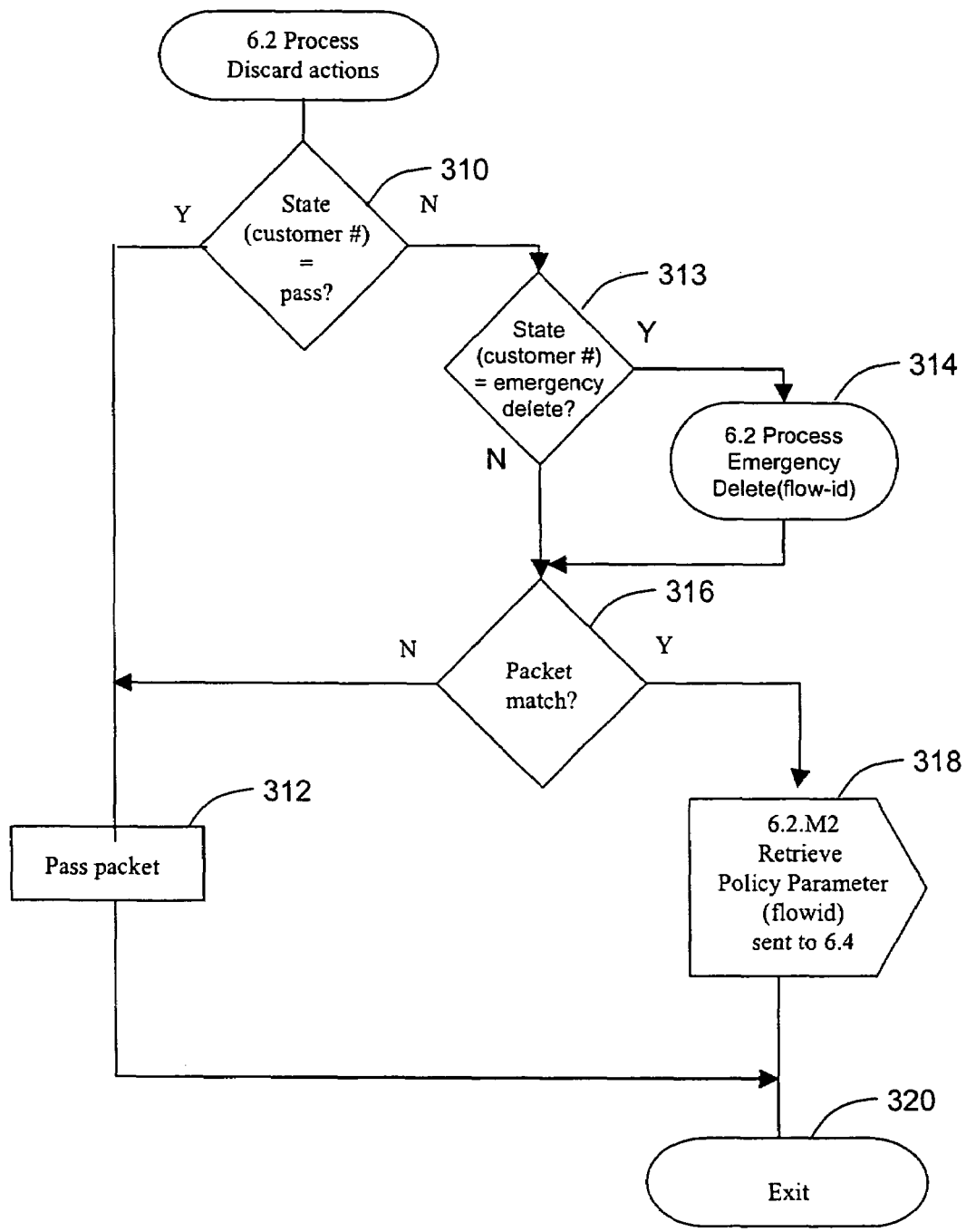

Turning again to FIG. 10, the process discard actions carried out on receipt of a packet other than a control packet (step 134) is illustrated in more detail in FIG. 15B. The process discard actions begins with a test (step 310) to see whether the state of the buffer associated with the customer receiving the flow to which the recently received packet belongs equals "pass". If the state of that customer's buffer is equal to "pass" then the packet is merely forwarded normally (step 312) from the broadband access node (FIGS. 1-6).

If the state of the customer's buffer is found not to equal "pass" in step 310 then the packet handler 6.2 carries out the emergency delete process (step 314—to be described in more detail with reference to FIGS. 16A and 16B below). In either case, a test (step 316) is thereafter made to see whether the flow-ID derived from the recently received packet matches a flow-ID of one of the flow entries included within the vulnerable flows table (FIG. 8) of the current customer. If no matching flow entry is found, then the packet is forwarded normally (step 312) and the process discard actions ends (step 320). If a corresponding entry is found in the vulnerable flows table (FIG. 8) for the current customer then the packet handler 6.2 sends (step 318) a request for the Policy Parameter for the flow entry to the flow parameter store 6.4.

Figure 15C:
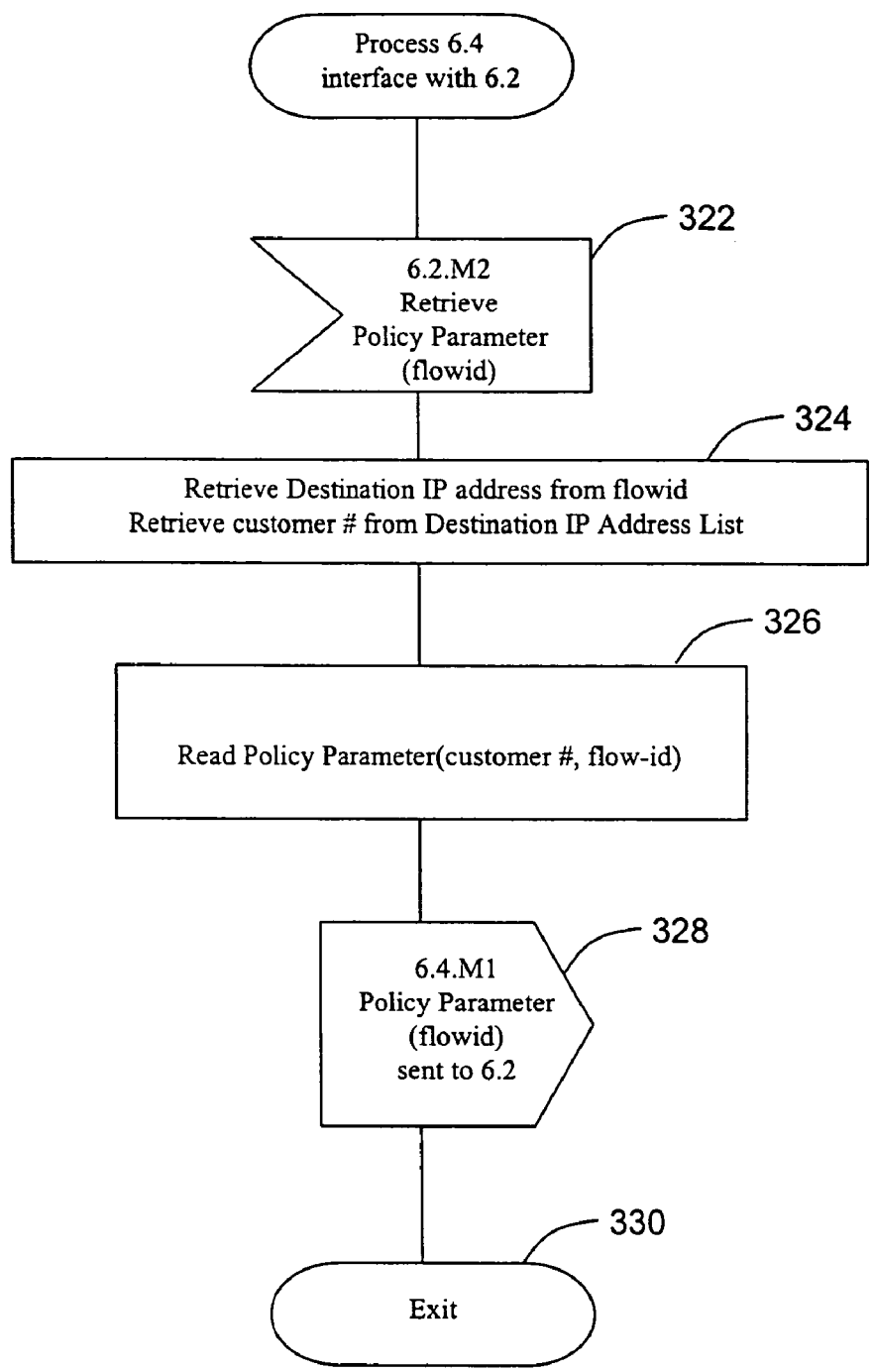

The response of the flow parameter store 6.4 to the request to retrieve a Policy Parameter for given flow-ID from the packet handler 6.2 is received by the flow parameter store 6.4 (FIG. 15C—step 322). Following the receipt of that message, the customer number corresponding to the current flow-ID is found (step 324) and the Policy Parameter from the corresponding flow entry is read (step 326). The flow parameter store 6.4 then returns the Policy Parameter to the packet handler 6.2 (step 328).

On receiving the Policy Parameter for the current flow-ID (FIG. 15D—step 340), the packet handler 6.2 carries out a test (step 342) to see whether the Policy Parameter returned is equal to 0 (it will be realised that this will only occur where the flow to which the current packet belongs is the most recently arrived flow in the vulnerable flows table (FIG. 8). Where that is the case, the token count value for the current flow is set to 0 (step 344). Where the Policy Parameter is set to a value other than 0 the number of tokens in the token bucket for the current flow is read (step 346).

Following the above steps, the packet handler 6.2 tests (step 348) whether:
a) the number of tokens available in the present flow's token bucket is equal to 0; or
b) the delete all flag of the current customer is set to 'true'.

If either condition is met then the packet is deleted (step 352). In other cases, the packet is forwarded normally (step 350). The processing responsive to the arrival of a non-control packet (which includes the processes illustrated in FIGS. 15B to 15D) then ends (step 354).

Figure 15D:
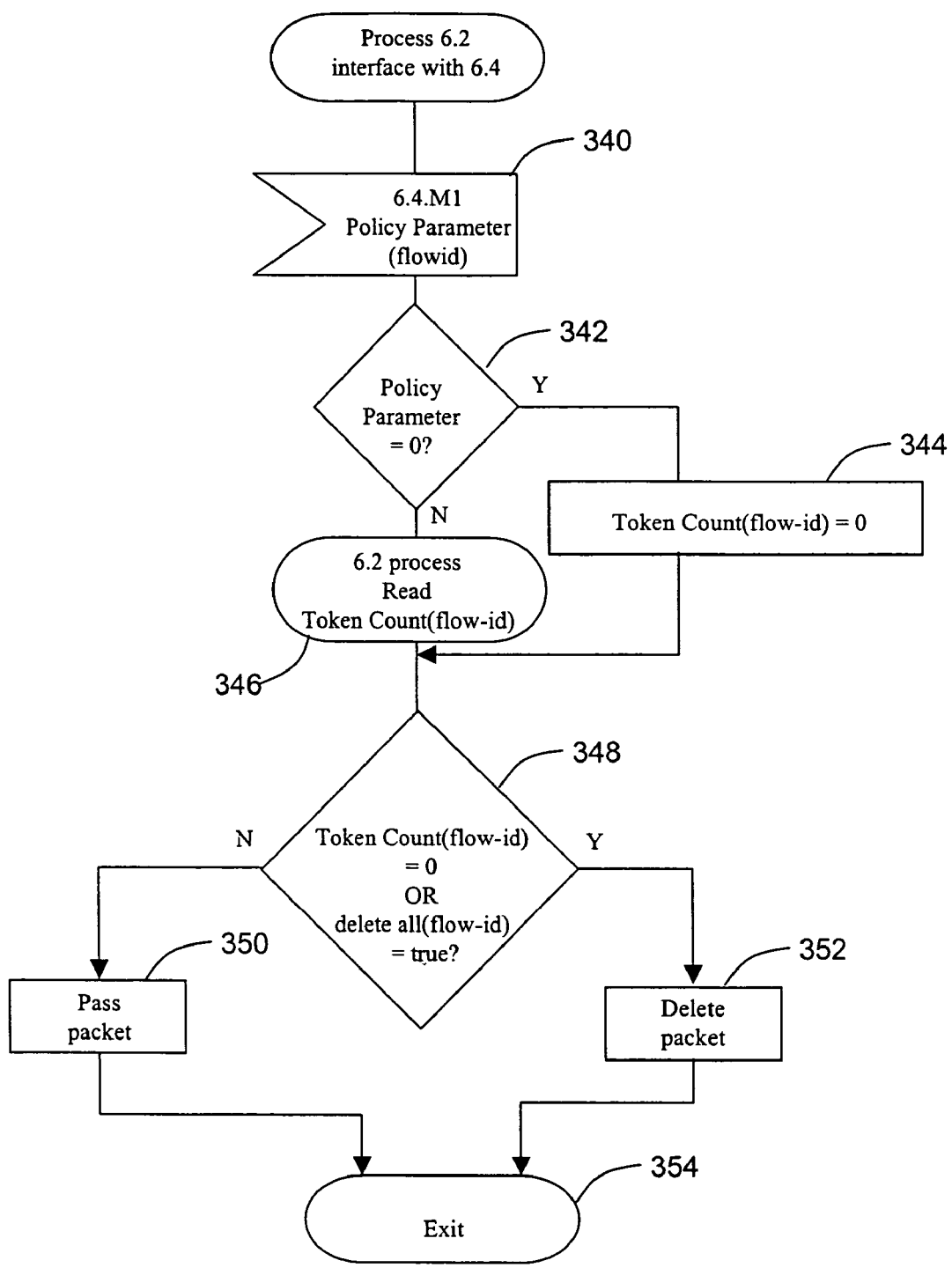
Figure 15E:
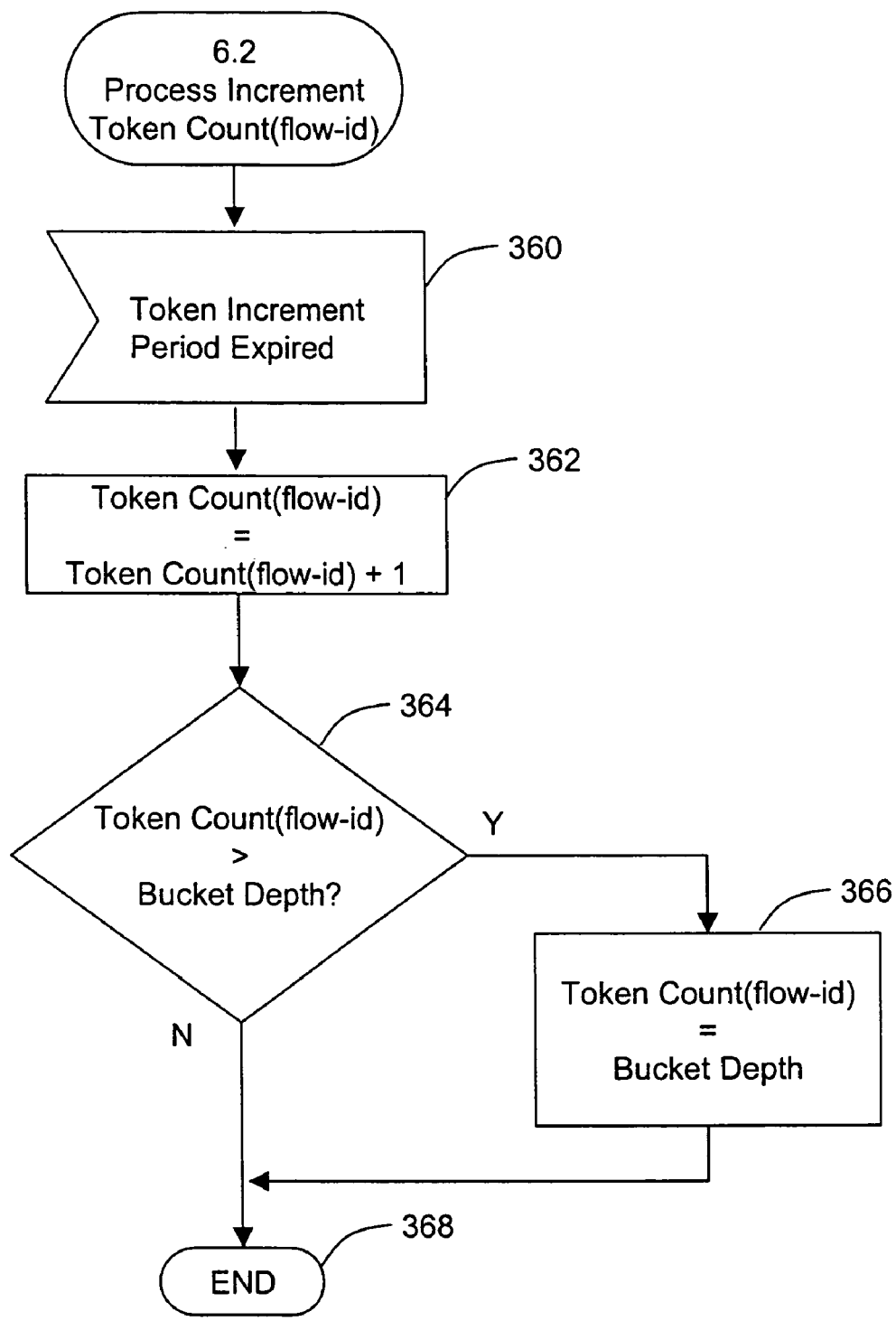

A process for incrementing the token count associated with a flow is illustrated in FIG. 15E. The process begins on receipt of an indication from an internal clock that a total increment period has expired (step 360). The increment period for a given flow is set to the maximum packet size divided by the Rate Advisory parameter associated with the flow. On receipt of the token increment signal the token count for the flow in question is increased by one (step 362). Thereafter, a test is made to see whether the token count of this flow now exceeds a predetermined bucket depth (step 364). If it does not, the process ends at (step 368). If on the other hand the token count is now greater than the bucket depth then it is set equal to the bucket depth in step 366. Thereafter, the process ends (step 368).

Figure 15F:
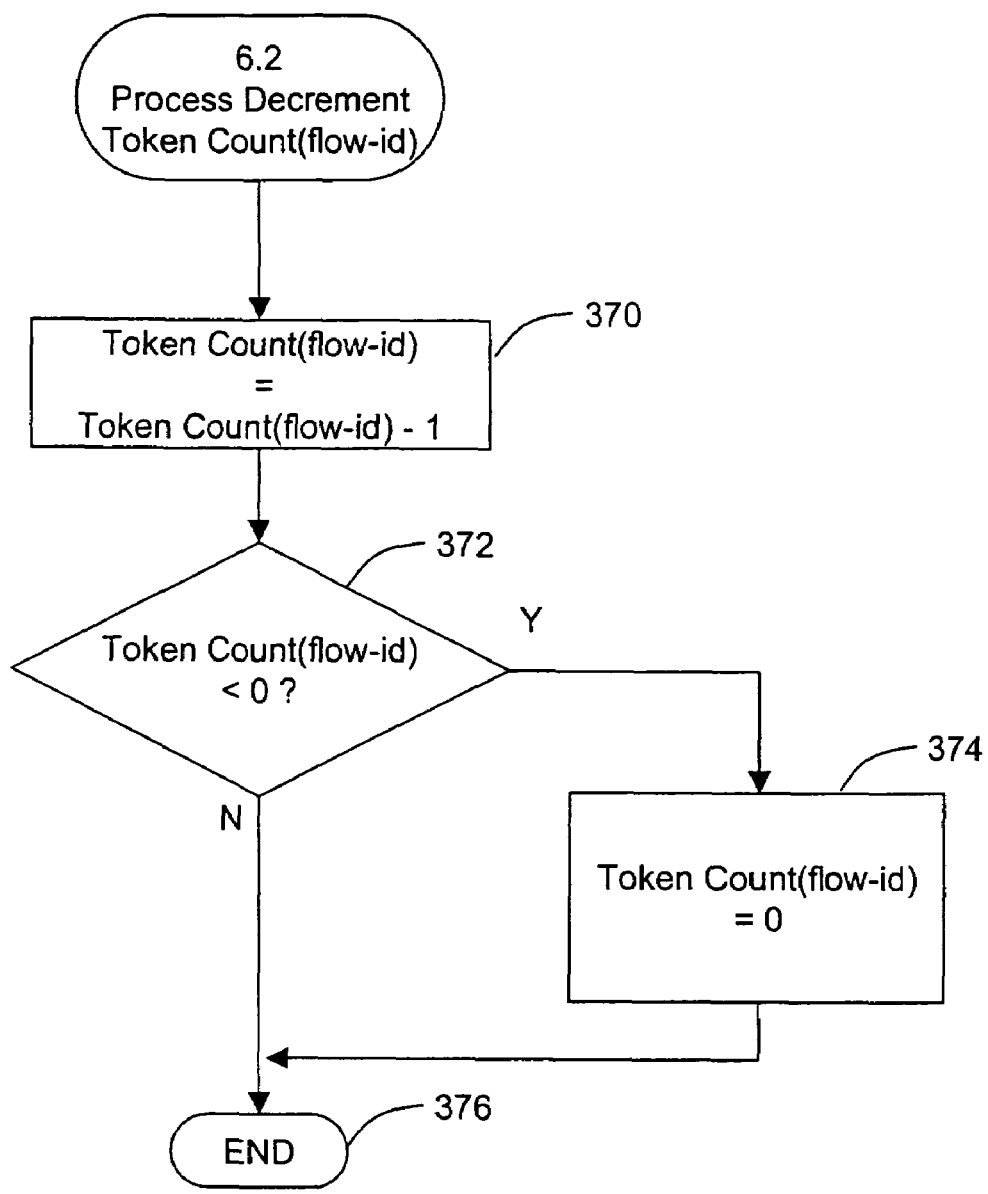

The process by which the token count associated with the given flow is decremented is illustrated in FIG. 15F. When that process is carried out, the token count associated with the flow is reduced by one (Step 370). Thereafter a test (step 372) is carried out to find whether the token count has become negative. If the token count is found to be negative then it is reset to 0 (step 374). In either case, the decrement process then ends (step 376).

Returning now to FIG. 10, it will be seen that each non-control packet is treated differently according to the state of the buffer associated with the customer to which it is addressed. If the state of that buffer is "pass" then the packet is forwarded normally. If, on the other hand, the state of that buffer is not 'pass' then (perhaps after the emergency delete processing described below with reference to FIG. 16A and 16B) a test is made to establish whether the packet belongs to a flow in the vulnerable flows table stored for that customer. If the packet is found to belong to a flow subject to a 'bronze' quality of service (normally the most recently arrived flow in the vulnerable flows table) then that packet is deleted. If, on the other hand, the packet is found to belong to a flow subject to a 'silver' or 'gold' quality of service then the flow will be restricted by a token bucket policing process. It will be understood that, in broad terms, the effect of the state of a customer's buffer moving from 'pass' to 'delete' is therefore to delete any packets belonging to the most recently started flow addressed towards customer in question and to rate-limit other recently started flows addressed towards that customer.

Figure 16A:
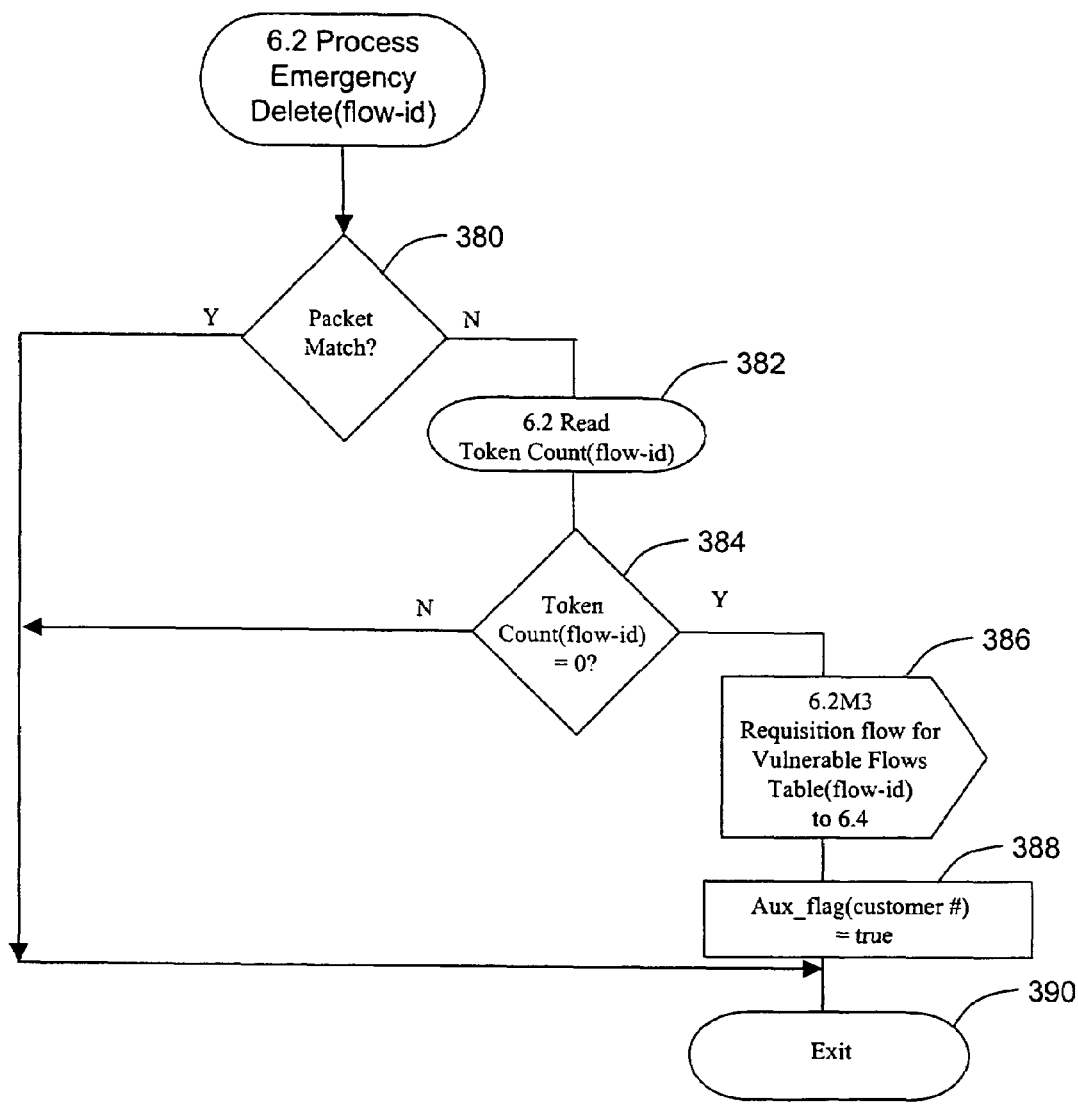
FIGS. 16A and 16B show processes for making additional entries in the vulnerable flow parameter tables (FIG. 8 being an example associated with one customer) when the buffer congestion state of FIG. 4 is equal to emergency delete.
Figure 16B:
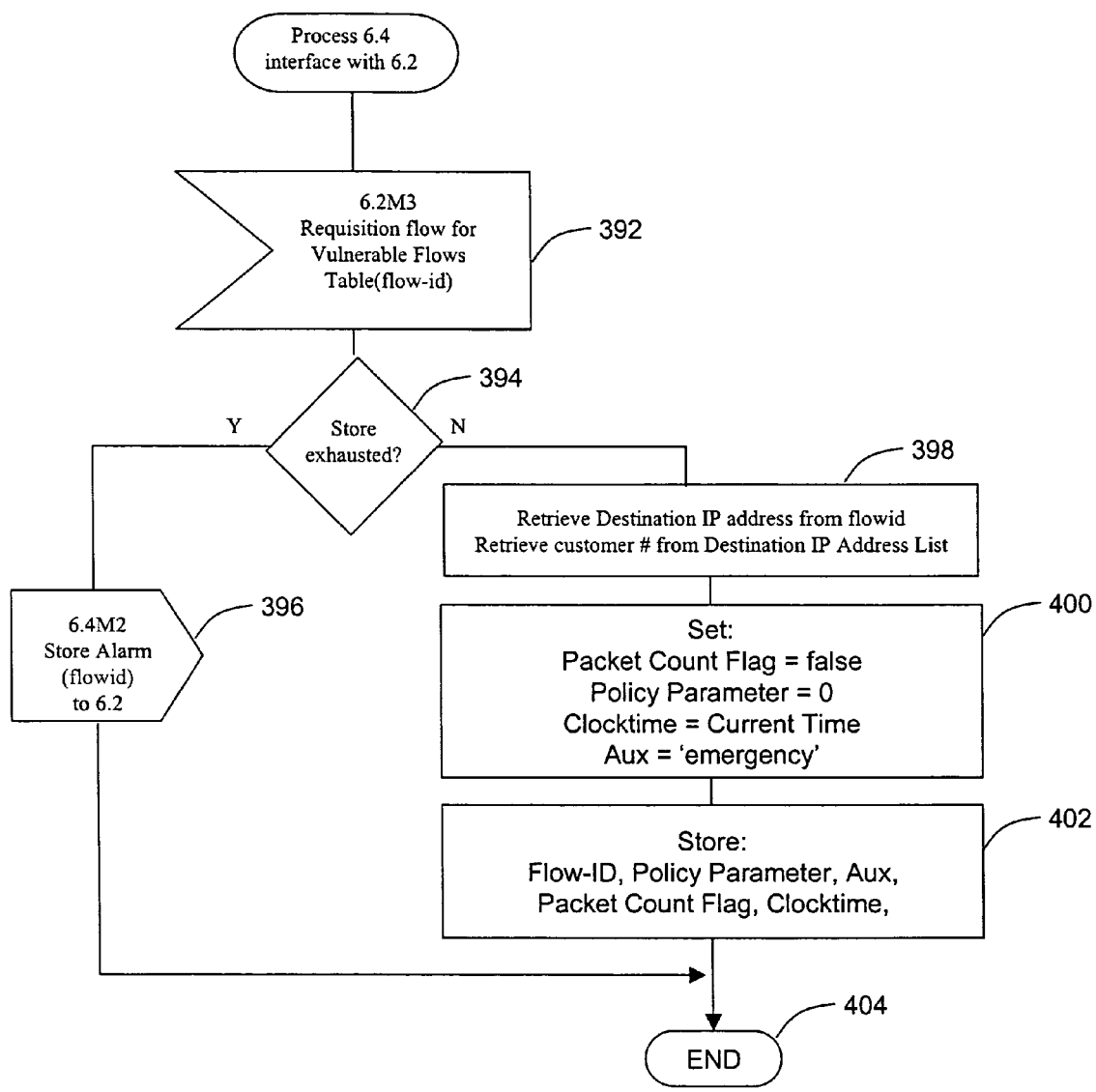

The process emergency delete carried out in response to the state of the customers buffer being found to be equal to "emergency delete" on the arrival of a non-control packet (FIG. 15B—step 314) is illustrated in more detail in FIG. 16A. The process begins with a test (Step 380) to see whether the non-control packet which has arrived belongs to a flow included within the vulnerable flows table (FIG. 8). If the packet does belong to such a flow then the emergency delete process ends (step 390)— it will be realised that the packet will then be deleted or the flow it belongs to will be rate-limited as explained in the previous paragraph. If, however, the packet belongs to a flow which is not included in the vulnerable flows table (FIG. 8) then the packet handler reads the current token count value for the flow to which the packet belongs (step 382). Thereafter, tests are carried out to see whether the token count for the present flow is equal to 0 (step 304). If the token count is found to be greater than 0 then the emergency delete process ends. If, on the other hand, the token count is found to be equal to 0 the packet handler 6.2 sends (step 386) a signal to the flow parameter store 6.4 indicating the flow to which the packet belongs is to be entered into the vulnerable flows table (FIG. 8). The auxiliary flag for the customer to which the packet is addressed is then set to 'true' (step 388) before the emergency delete process ends (step 390).

On receiving (step 392) the instruction to enter the flow in the vulnerable flows table from the packet handler 6.2, the flow parameter store 6.4 checks to see that the request has not caused the maximum number of entries allowed in the vulnerable flows table to be exceeded (step 394). If that limit is exceeded then the flow parameter store 6.4 sends (step 396) a store alarm message to packet handler 6.2.

If there is sufficient space in the vulnerable flows table for additional entries then the customer number associated with the flow to be entered into the vulnerable flows table is found (step 398). The variables packet count flag, Policy Parameter, clocktime and aux for the requisitioned flow are then set to the values 'false', 0, the current time, and "emergency" respectively (step 400). A flow entry is then made (step 402) in the vulnerable flows table (FIG. 8) with the variables being set to the values given above. The process then ends (step 404).

It will be seen that the effect of the process emergency delete is to add the flow of a received non-control packet to the vulnerable flows table if that flow is equalling or exceeding its token bucket parameters. The Policy Parameter for that flow is set to 0 (i.e. the flow is to receive 'Bronze' quality of service). The packet being investigated will then certainly pass the packet match test (FIG. 15B—step 316) and, because it is to receive a 'Bronze' quality of service, thereafter be deleted (FIG. 15D—step 352). Further packets from the same flow arriving at 6.2 will also be deleted. The addition of flows to the vulnerable flows table in this way should cause the load on the buffer to decrease to the point where the buffer state changes to 'pass'.

The emergency delete process provides a mechanism for dealing with a source that sends the initial packets of a flow at a low rate and then increases the rate at which it sends packets once the flow has been removed from the vulnerable flows table (picking a packet at random has the beneficial effect of targeting flows that are sending packets at a higher rate than other flows).

Figure 17A:
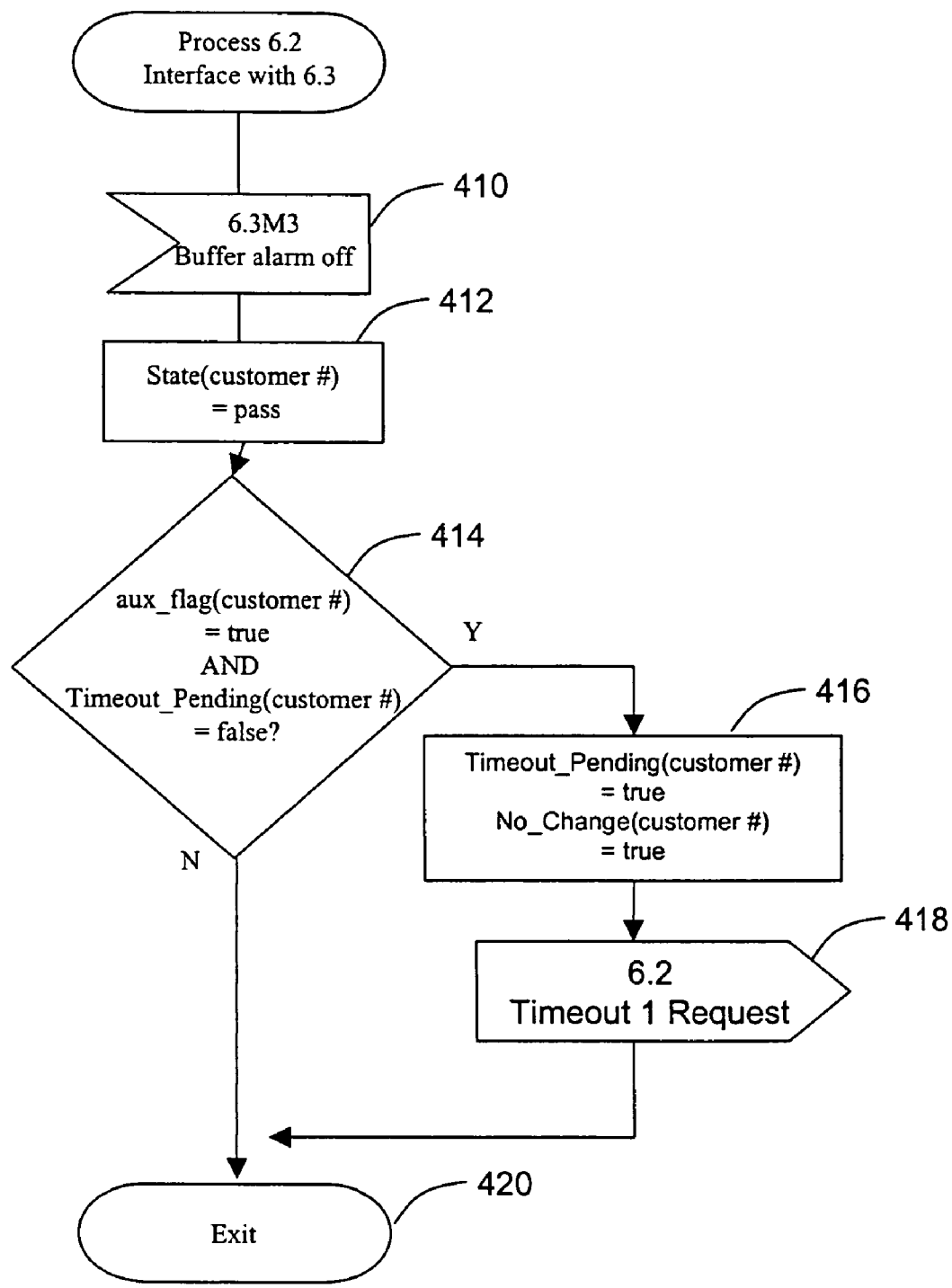
FIGS. 17A, 17B, and 17C show processes carried out to remove flow entries earlier placed in the vulnerable flow tables on the congestion state of the buffer improving from 'emergency delete' to 'pass'.
Figure 17B:
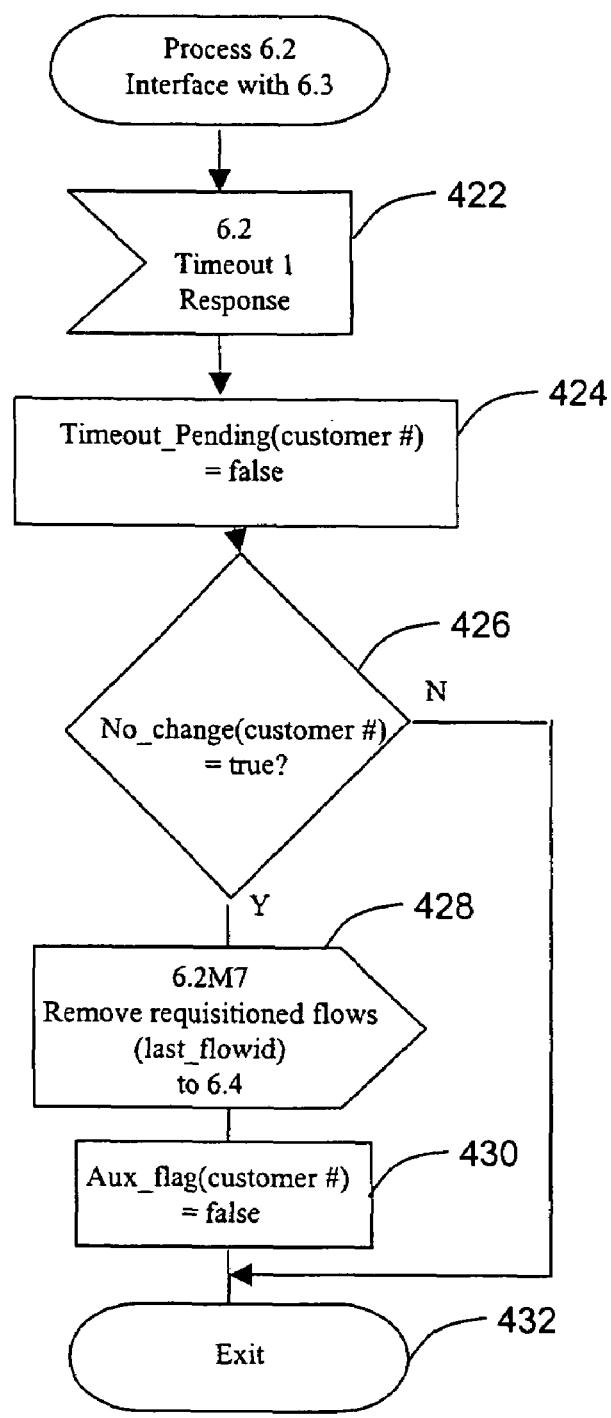
Figure 17C:
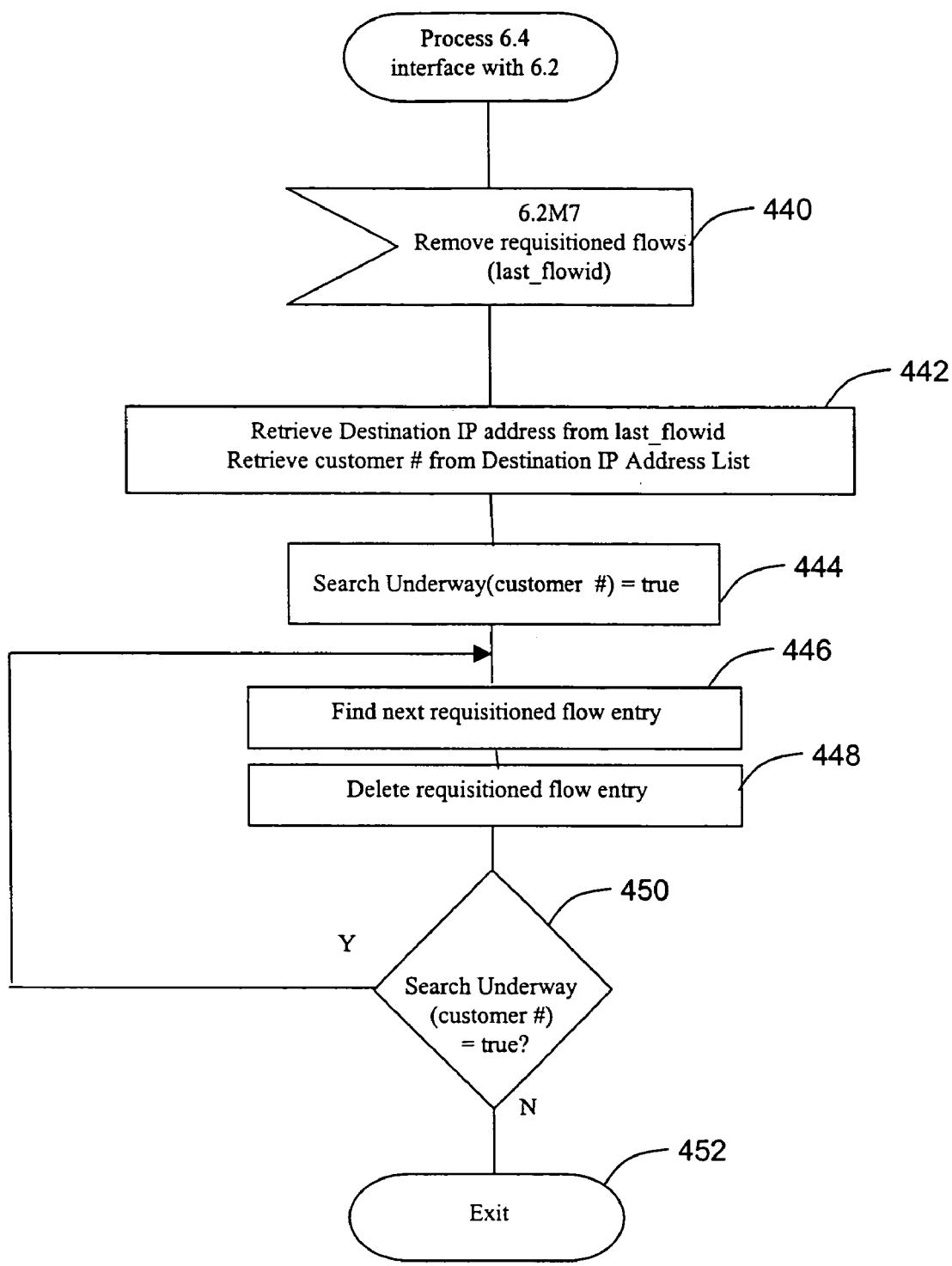
Figure 18:
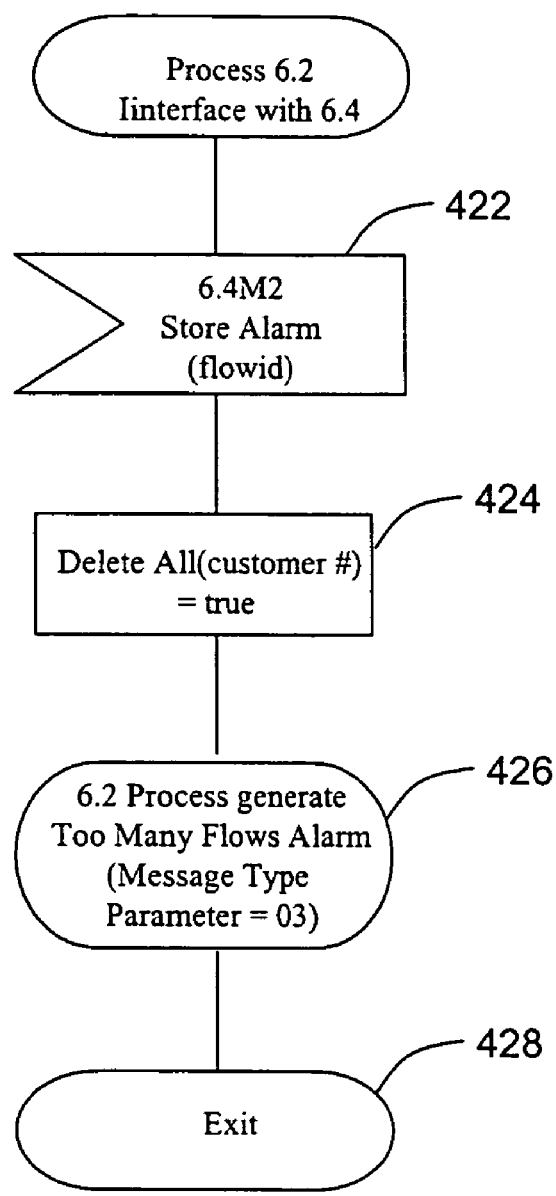
FIG. 18 shows a process that is run on an attempt to store too many flows in one customer's susceptible flow table.

Once the requisition of flows into the vulnerable flows table reduces the buffer fill level below the first threshold level, a 'buffer alarm off' (FIG. 9D) signal will be generated by the controller 6.3. FIG. 17A shows the processing which is carried out by the packet handler 6.2 on receiving (step 410) the 'buffer alarm off' signal from the controller 6.3. As is indicated in FIG. 4, the first action on receiving a buffer alarm off signal is to update the state associated with the customer whose buffer has produced the signal to "pass" (step 412). Once this has been done, a test is made as to whether the auxiliary flag associated with the current customer is true whilst the timeout pending flag of the current customer is false (step 414). If these conditions are not met then the process ends (step 420). If on the other hand, both the conditions are met then the timeout pending flag associated with the current customer is set to 'true' as is the no change flag associated with the current customer (step 416). Once that has been done, a timeout request is sent (step 418) to a timing function which requests the timeout response after a few seconds. The process then ends at (step 420).

On the timing function returning the time out response after a few seconds (FIG. 17B—step 422), the timeout pending flag associated with the current customer is set to 'false' (step 424). Next, a test (step 426) is carried out to see whether the no change flag for the current customer is still set to true (note that the only way in which this flag can have been reset is if a lower threshold buffer alarm has been received (step 92 FIG. 9E) by the packet handler 6.2 during the timeout period. If has happened in the timeout period, then the process ends (step 432). If, on the other hand, there has been no change in the buffer state during the timeout, the packet handler 6.2 sends (step 428) a signal to the flow parameter store 6.4 requesting the that requisitioned flows are removed from the vulnerable flows table (FIG. 8). The request is accompanied by the last flow-ID parameter (set in FIG. 10—step 132). If that request has been sent, the auxiliary flag for the current customer is set to false (step 430) before the process ends (step 432).

On receiving (step 440) the remove requisition flow instruction from the packet handler 6.2, the flow parameter store 6.4 retrieves (step 442) the customer number associated with the last flow-ID passed as a parameter of the request. Thereafter, the flag indicating that a search through the vulnerable flows table (FIG. 8) is underway is set to true (step 444). Next, the vulnerable flows table (FIG. 8) for the current customer is searched to find the next flow entry which has its "aux" parameter set to "emergency" (step 446). Once such an entry is found, it is deleted (step 448). If no such entry is found in the vulnerable flows table then the search underway flag of the current customer is set to false. If further flow entries are present then a second test (step 450) finds the search underway flag to be set to 'true' and repeats the processes of finding a flow entry with its aux variable set to "emergency" and deleting it. If, on the other hand, the search underway flag is set to false then the removal of requisitioned flows from the vulnerable flows table (FIG. 8) ends (step 452).

It will be seen that the combined effect of the packet handler 6.2 receiving a buffer alarm off message is to remove any requisitioned flows present in a customers vulnerable flow table (FIG. 8) provided that the buffer state remains at "pass" for more than a few seconds. The check that the buffer state remains at "pass" for more than a few seconds prevents a flow being requisitioned for a short while, then being removed from the vulnerable flows table, with another flow taking its place shortly afterwards. That would result in a larger number of flows being affected by congestion, which is undesirable.

On receiving a store alarm (step 442) from the flow parameter store 6.4 (either in response to the introduction of a requisitioned flow (FIG. 16B) or the arrival of a start packet (FIG. 12), the packet handler 6.2 sets the delete all flag associated with the customer whom has requested too many flows to 'true' (step 424). It will be understood that this has the effect of causing any packet belonging to any flow in the vulnerable flows table (FIG. 8) for this customer to be deleted (FIG. 15D—step 352). Once the delete all flag has been set, the packet handler 6.2 generates a 'too many flows' alarm packet (step 426) which has the form shown in FIG. 2 with the message type byte being set to the value 03. Once that packet has been sent, the process ends (step 428).

The set top box (FIGS. 1-16) is programmed to respond to the too many flows alarm by indicating to the user that the system requires resetting and that this can only be achieved by contacting the administrator of the wide area network 22.

It will be seen that the above embodiment:
i) in effect, places identifiers of newly started flows in a 'window' (the vulnerable flow table), and, after a period of time, allows the flows to move out of the 'window' and into a 'guaranteed area'. Once the flows have been moved to the 'guaranteed area', they will not be subject to packet loss unless extreme traffic conditions arise in which case selected flows will be targeted, allowing other flows to continue without any loss or undesirable packet delays;
ii) allows the admission of variable rate packet flows to the wide area network 22 without the imposition of a constraint of accepting only a set of flows whose peak rates are less than the available capacity;
iii) the admission of variable rate packet flows without a requirement for monitoring the remaining capacity of the communications channel to the customer;
iv) the admission of packet flows without the imposition of a requirement that state information on all admitted flows is maintained;
v) the admission of packet flows without the imposition of a requirement for the suspension of session control protocols;

A number of alterations can be made to the above embodiment without departing from the scope of the present invention. Such alterations include:

i) the sending of only a single start packet prior to the issuance of a packet flow. In the above embodiment, sending two start packets was preferred since this reduces the probability of the start packet not reaching the broadband access node (FIG. 1-6) which would result in the flow, in effect, immediately being placed in the 'guaranteed area';

ii) the vulnerable flow table, might, for example, only contain the flow-ID of the most recently started flow. It is to be noted that altering the number of entries held in the vulnerable flows table (FIG. 8) allows the operator of the broadband access node to offer a service which is akin the conventional connection-oriented operation of telephony networks (when the vulnerable flows table contains only a single entry, then only the latest flow is disrupted on the advent of congestion) or to a service which is akin to the best-effort operation of the Internet (when the vulnerable flows table has many entries, then a large number of flows are disrupted on the advent of congestion). Indeed, by altering the number of entries in the vulnerable flows table, the operator of the broadband access node can select a mode of operation at either extreme or at various points in between;

iii) In the above-described embodiment, 'Silver' or 'Gold' flows are less vulnerable to discard than 'Bronze' flows. In normal operation, only the most recently activated flow is classified as belonging to the 'Bronze' class. In some embodiments of the present invention, the policy parameter is not used;

iv) although the above-described embodiment describes one possible implementation of the present invention in a DSL local access network, the invention might be realised in another type of access network e.g. a cable network. The invention could be embodied at any network node where flows are contending for network resource;

v) in the above described embodiment, a packet flow refers to a stream of packets sent from a source computer to a customer's terminal. However, in some embodiments of the invention the packets may be being 'tunnelled' through the node. For example, a content provider might have been provided with a Virtual Private Network which extends from its Internet router to its customers. In a common implementation of a Virtual Private Network, packets generated by any one of the content provider's computers connected to that local area network will have an additional IP header added on exit from the content provider's network onto the Internet (which takes place in an access router). It is that header that would be analysed by the node of the present embodiment. Embodiments of the present invention could therefore place a flow-ID which applies to a number of 'packet flows' in the vulnerable flows table (FIG. 8). Thus, all packets from a given content provider might be deleted on the onset of congestion (were any one of those packets to be selected in the emergency discard process described above). By altering the software in the router at the start of the 'tunnel' to generate a start packet prior to sending a communication comprising a plurality of flows, the above embodiment could be applied to such communications as well as normal (i.e. not 'tunnelled') packet flows;

vi) In the above-described embodiment, the level of congestion monitored is that in the network node and measures to combat that congestion are undertaken in the node. However, one or more of the processes described above may be carried out at a different network element. In addition, one or more of the stores described above could be located at a different network element.

The invention claimed is:

1. A method of operating a packet subnet, said method comprising:
receiving one or more communication announcement packets indicative of the commencement of a packet communication through said subnet, said packet communication comprising a plurality of packets;
responsive to receipt of said one or more communication announcement packets, storing a set of communication identifiers, each communication identifier enabling identification of packets belonging to one of said announced packet communications;
responsive to the elapse of a period of time after the commencement of said communication, removing an identifier from said set of stored identifiers prior to the cessation of the associated communication;
receiving packets belonging to communications associated with one of said set of stored identifiers, and packets belong to other communications not associated with any of said set of stored identifiers;
on a threshold level of congestion being reached in said packet subnet:
identifying the packets belonging to a communication associated with one of said set of stored identifiers; and
forwarding packets belonging to the other communications not identified by any of said set of stored identifiers in preference to packets so identified.

2. A method according to claim 1 wherein said forwarding step involves discarding said identified packets whilst forwarding said packets belonging to other communications.

3. A method according to claim 1 wherein each packet of a communication contains the communication identifier associated with said communication.

4. A method according to claim 3 further comprising, on a high level of congestion being reached in said subnet:
reading said communication identifier from a packet received at a network node; and
adding said communication identifier to said set.

5. A method according to claim 1 wherein said predetermined condition comprises the addition of an identifier to said set of stored identifiers.

6. A method according to claim 5 wherein said announcement packets contain an indication of the anticipated data-rate of said communication, said predetermined condition comprising the exceeding of a predetermined threshold by said cumulative anticipated data-rate of said communications.

7. A method according to claim 1 wherein said set of communication identifiers comprises a plurality of subsets of communication identifiers, a communication identifier first being placed in a first subset and moving to a second subset on the occurrence of a subset removal condition being met, wherein, on the onset of congestion, packets in said second subset are forwarded in preference to packets in said first subset.

8. A method according to claim 1 further comprising the steps of:
receiving a protected-communication indication which is indicative that one or more communications are protected;
wherein said communication identifier storing step stores identifiers of communications for which no such indication is received.

9. A method according to claim 8 wherein said protected-communication indication is carried in the communication announcement packet announcing said communication.

10. A method according to claim 8 wherein said protected-communication indication is read from a data store accessible to said packet network node.

11. A method according to claim 1 wherein said communication comprises one packet flow.

12. A method according to claim 1 wherein said packets are constructed in accordance with the Internet Protocol.

13. A method of operating a packet network node comprising:
receiving one or more communication announcement packets indicative of the commencement of a packet communication through said node;
responsive to receipt of said one or more announcement packets, storing a set of communication identifiers, each communication identifier enabling identification of packets belonging to one of said announced packet communications;
responsive to the elapse of a period of time after the commencement of said communication, removing an identifier from said set of stored identifiers prior to the cessation of the associated communication;
receiving packets belonging to communications associated with one of said set of stored identifiers, and packets belong to other communications not associated with any of said set of stored identifiers;
on a threshold level of congestion being reached in said packet node:
identifying the packets belonging to a communication associated with one of said set of stored identifiers; and
degrading the forwarding of packets so identified relative to packets belonging to the other communications not identified by any of said set of stored identifiers.

14. A packet network node comprising:
an input for receiving one or more packets;
means arranged in operation to detect congestion in said packet network node;
a communication identifier store for storing a set of communication identifiers;
means arranged in operation to detect communication announcement packets received at said input, and responsive to said detection to store, in said communication identifier store, a communication identifier included in said communication announcement packet;
means arranged in operation to remove, on the elapse of a period of time after the commencement of said communication, a communication identifier from said communication identifier store prior to the cessation of the communication;
means arranged in operation to detect packets received at said input belonging to communications associated with one of said set of stored identifiers, and packets belong to other communications not associated with any of said set of stored identifiers;
means arranged in operation, on the detection of congestion by said congestion detection means, to:
identify packets received at said input belonging to communication associated with one of said communication identifiers stored in said communication identifier store; and
forward packets belonging to the other communications associated with one of said communications identifiers stored in said communication store in preference to said packets so identified.

* * * * *